(12) United States Patent
Baker

(10) Patent No.: US 10,040,383 B2
(45) Date of Patent: Aug. 7, 2018

(54) VEHICLE TRAY

(71) Applicant: Forrest S. Baker, Heyburn, ID (US)

(72) Inventor: Forrest S. Baker, Heyburn, ID (US)

( * ) Notice: Subject to any disclaimer, the term of this patent is extended or adjusted under 35 U.S.C. 154(b) by 0 days.

(21) Appl. No.: 15/376,269

(22) Filed: Dec. 12, 2016

(65) Prior Publication Data
US 2018/0162252 A1  Jun. 14, 2018

(51) Int. Cl.
B60R 11/00 (2006.01)
B60N 3/00 (2006.01)
B60N 3/10 (2006.01)

(52) U.S. Cl.
CPC ............ B60N 3/002 (2013.01); B60N 3/103 (2013.01); B60R 2011/0075 (2013.01); Y10S 224/926 (2013.01)

(58) Field of Classification Search
CPC .... A47G 19/065; A47G 9/06; A47G 23/0641; B60N 3/002; B60N 3/103; B60N 3/10; B60N 3/107; B60R 2011/0075; Y10S 224/926; A47C 7/68; A47C 7/70
USPC ...................... 224/544, 539, 926; 108/25, 26
See application file for complete search history.

(56) References Cited

U.S. PATENT DOCUMENTS

| 2,668,744 | A |   | 2/1954 | Cockrell |          |
|-----------|---|---|--------|----------|----------|
| 4,003,598 | A |   | 1/1977 | Glaze    |          |
| 4,927,024 | A | * | 5/1990 | Lloyd    | A47D 1/008 |
|           |   |   |        |          | 206/562  |
| 5,370,060 | A |   | 5/1994 | Wang     |          |
| 5,601,268 | A | * | 2/1997 | Dunchock | B60N 3/102 |
|           |   |   |        |          | 224/926  |
| 6,942,267 | B1 | * | 9/2005 | Sturt   | B60N 3/102 |
|           |   |   |        |          | 248/311.2 |
| 7,114,772 | B2 |  | 10/2006 | Kobayashi et al. | |
| 7,681,852 | B2 |  | 3/2010 | Magee    |          |
| 8,002,323 | B2 |  | 8/2011 | Jones et al. |      |
| 9,221,376 | B2 | * | 12/2015 | Baker  | B60N 3/103 |
| 2012/0048149 | A1 | * | 3/2012 | Pendleton | A47G 23/0641 |
|           |   |   |        |          | 108/13   |
| 2015/0232042 | A1 | * | 8/2015 | Baker   | B60N 3/103 |
|           |   |   |        |          | 224/539  |

FOREIGN PATENT DOCUMENTS

JP            3932105       6/2007
JP         2009-083831      4/2009

* cited by examiner

Primary Examiner — Adam Waggenspack
(74) Attorney, Agent, or Firm — Thorpe North & Western

(57) ABSTRACT

A tray for use in a vehicle may include a base sized and shaped to fit within a vehicle cup holder and a tray attachable to the base and repositionable on the base to different positions. Slidable panels can support different sized beverage containers through openings of the tray.

20 Claims, 22 Drawing Sheets

VEHICLE TRAY

BACKGROUND

Motor vehicles are a common means of transportation. Manufacturers of motor vehicles often attempt to devise new configurations of vehicles to add additional features and comfort to occupants of the vehicles. With many people employed in the shipping and transportation industry, as well as a large number of people employed at some distance from work that involves commuting, many features have been added to vehicles to enable easier consumption of food or beverages while in the vehicle. For example, cup holders are commonly included in many modern cars.

In addition to being a matter of convenience, many people may wish to consume meals, such as breakfast, lunch or dinner while driving or riding in a vehicle and within the confines of the vehicle. For example, salesman, commercial truck drivers and the like may spend a large portion of the day driving and may not have the time or convenience to stop to eat a meal. Some options for meals include purchasing food at a fast food outlet. Over a long period of time, regular consumption of food from a fast food outlet may give rise to health concerns.

Additionally, despite the availability of cup holders in many vehicles, there are yet a large number of vehicles that may not easily accommodate food in addition to beverages. Managing food items in the vehicle may be a delicate task to avoid inconvenience to the driver while also making the food readily available to the driver and minimally likely to topple over.

SUMMARY

It has been recognized that it would be advantageous to develop a tray for use in a vehicle which is compatible with existing vehicle configurations and which is configurable to various different existing vehicle configurations. Furthermore, the tray may be able to supplant or augment available options for holding food or beverages in existing vehicle configurations. The tray may be designed to support a larger or greater amount of food or beverages and/or to support greater weight than other existing vehicle trays.

The technology provides a tray for use in a vehicle which may include a base sized and shaped to fit within a vehicle cup holder. The tray may be attachable to the base and repositionable on the base to different positions.

In accordance with a more detailed aspect of the present technology, the system includes a track formed in a bottom of the tray. The tray may be slidably attachable to the base along the track.

The base may include a track insert sized and shaped to fit within the track.

A height of the insert may be less than a width of the track insert. The width of the track insert may be less than a length of the track insert.

Sides of the track insert and the track may extend at an oblique angle with respect to a top of the base or the bottom of the tray.

The base may further include a shoulder portion having a planar surface for supporting the tray by supporting the track.

The track may be repositionable along the bottom of the tray and may include a track securing device to secure a position of the track.

The base may include a lower portion and a shoulder portion. The lower portion may have a circular cross-sectional shape and the shoulder portion may have a polygonal cross-sectional shape.

The shoulder portion of the base may have a greater cross-sectional width than the lower portion. The base may further include a tapered transition portion transitioning from the circular cross-sectional shape to the polygonal cross-sectional shape with the greater cross-sectional width.

The tray may include a plurality of circularly shaped recesses formed through a bottom of the tray. The recesses may be sized to receive a beverage container.

A tray wall may circumscribe an edge of the tray and extend upwardly from the tray away from the base.

The tray wall may circumscribe the edge of the tray and extend downwardly from the bottom of the tray, toward the base.

A track may be formed in the bottom of the tray. The tray may be slidably attachable to the base along the track.

The tray wall may extend downwardly from the edge of the tray and the bottom of the tray may be vertically inset from a bottom of the wall.

An inner portion of the track may be flush with the bottom of the wall.

An outer portion of the track may extend below the bottom of the wall.

The wall may include interlocking wall sections. Each wall section may include a groove for receiving the edge of the tray.

The tray may be repositionable on the base at any position along an entire width or length of the track.

The tray may include multiple perpendicular tracks along a bottom of the tray. The tray may be slidably attachable to the base using at least one of the plurality of perpendicular tracks.

The base may include a track insert sized and shaped to fit within an individual track of the multiple perpendicular tracks. The base may be further sized and shaped to be slidable within the individual track by insertion from an end of the individual track. A length of the track insert may be greater than a width of an intersection of the plurality of perpendicular tracks.

The tray may include or be configured to receive a securing device insertable through a top of the tray into the base to secure the tray to the base. For example, the securing device may be similar to a common golf tee.

The tray may be formed of wood or any other suitable material.

The technology further provides a tray for use in a vehicle which may include a tray having a bottom and a circularly shaped recess formed through the bottom. The recess may be sized to receive a beverage container. A track may be attached to the bottom of the tray. A base may be removably and respositionably attachable to the track.

The base may include a track insert slidably receivable within the track. The track insert may have a length L, a width W and a height H with a relationship H<W<L. Walls extending along the height of the track insert may extend at an oblique angle with respect to a planar top of the base. A shoulder portion may be adjacent to the walls of the track insert and may be configured to support the tray about the track. A lower portion of the base may be sized and shaped to fit within a vehicle cup holder. The lower portion may have a different size and shape than the shoulder portion. The base may further include a transition portion having a taper tapering between the shoulder portion and the lower portion.

The technology further provides a tray for use in a vehicle, including a vehicle use tray and a base sized and shaped to fit within a vehicle cup holder. The base may be removably attachable to the tray and slidably positionable on a bottom of the tray at a plurality of different locations.

The technology may provide a method of using a tray in a vehicle, including positioning a base within a vehicle cup holder and coupling a tray to the base by sliding the tray onto the base. The method may further include securing the tray to the base by inserting a securing device through an aperture in the tray from a top portion of the tray into an orifice in the base.

The technology provides a tray for use in a vehicle. The tray can have at least one opening formed through a bottom of the tray. The tray can have a first support panel slidably engaged about the bottom of the tray. The first support panel can be slidable between a closed position and an open position relative to the at least one opening. The at least one opening is sized and shaped to laterally and vertically support a tapered beverage container when the first support panel is in the open position. The first support panel is sized and shaped to vertically support a cylindrical beverage container when the first support panel is in the closed position. In one example, the tray is supportable by a cup holder of the vehicle.

In one example, the tray comprises a track formed in a bottom of the tray, wherein the first support panel is slidable about the track. A second support panel is slidable about the track between a closed position and an open position relative to another one of the at least one opening. The second support panel is configured to support a beverage container when in the closed position.

In one example, the track is included in a first pair of tracks supported about the bottom of the tray and about which the first support panel slides.

In one example, the tray comprises a second pair of tracks supported about the bottom of the tray about which the second support panel slides.

In one example, the tray comprises a center track member extending along the bottom of the tray. The center track member can have a first center track about which the first support panel is slidably supported and a second center track about which the second support panel is slidably supported. The first pair of tracks include the first center track and a second pair of tracks including the second center track.

In one example, the tray comprises a base slidably attached to a central center track of the center track member, wherein the base is sized and shaped to fit within a cup holder of the vehicle and is configured to support the tray while supported by the cup holder.

In one example, the tray comprises a first side track along a first side of the tray and a second side track along a second side of the tray. The first side track and the first center track cooperatively support the first support panel. The second side track and the second center track cooperatively support the second support panel.

In one example, the base comprises a track insert sized and shaped to fit within the central center track.

In one example, the tray is repositionable on the base at any position along an entire width or length of the track.

In one example, the at least one opening vertically and laterally supports inwardly tapered sides of the tapered beverage container, and the first support panel vertically supports the cylindrical beverage container comprising substantially parallel sides.

In one example, the tray comprises an upper tray panel having at least one opening positioned above the at least one opening of the bottom of the tray, wherein the pair of openings are sized and shaped to support the tapered beverage container.

In one example there is provided a tray system for use in a vehicle. The tray system can comprise a base sized and shaped to fit within a vehicle cup holder. A bottom tray panel can be attachable to the base, and the bottom tray panel can have a first opening and a second opening. The system can comprise a first support panel and a second support panel. The first and second support panels can each be slidably engaged about the bottom of the tray and movable between a closed position and an open position. The first and second openings are sized and shaped to laterally and vertically support a tapered beverage container when in the open position. The first and second support panels are sized and shaped to vertically support a cylindrical beverage container when in the closed position to prevent the cylindrical beverage container from falling through at least one of the first and second openings. In one example there is provided a method for supporting different beverage containers. The method can comprise positioning a tray having a first opening formed through a bottom of the tray in a vehicle. The tray can have a first support panel slidably engaged about the bottom of the tray. The first support panel can be slidable between a closed position and an open position relative a first opening. The method can comprise supporting a tapered beverage container laterally and vertically using the first opening when the first support panel is in the open position. The method can comprise sliding the first support panel between the open position and the closed position. The method can comprise supporting a cylindrical beverage container vertically using the first support panel when the first support panel is in the closed position. The operations can be repeated for a similar second support panel about a second opening of the tray.

BRIEF DESCRIPTION OF THE DRAWINGS

FIG. 5a is a front view of a base for supporting a tray in accordance with an embodiment of the present technology;

FIG. 5b is a side view of a base for supporting a tray in accordance with an embodiment of the present technology;

DETAILED DESCRIPTION

Figure 1:
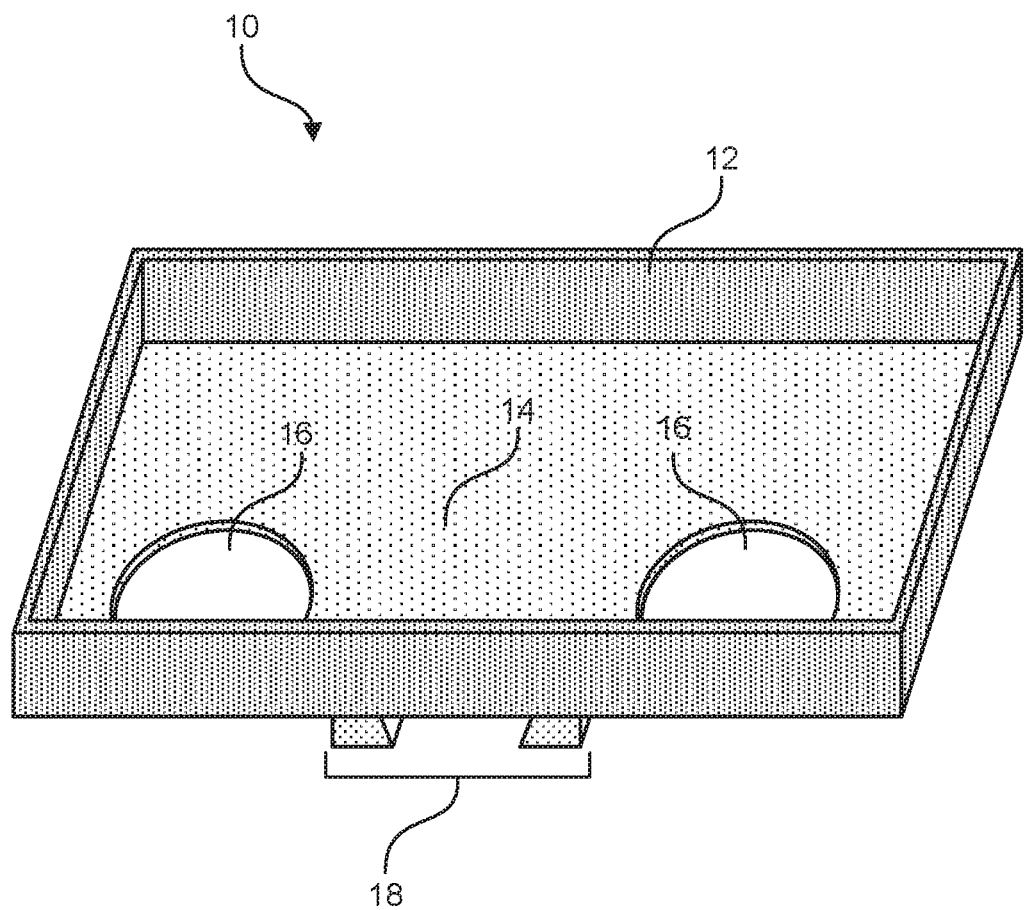
FIG. 1 is a front right perspective view of a tray in accordance with an embodiment of the present technology.

Before the present disclosure is described herein, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

The following terminology will be used in accordance with the definitions set forth below.

As used herein, "adjacent" refers to near or close sufficient to achieve a desired effect. Although direct physical contact is most common and preferred in the structures or volumes of the present invention, adjacent can broadly allow for spaced apart features.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Dimensions, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

The Disclosure

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the system, or the related devices or methods, individual or separate descriptions are considered applicable to one other, whether or not explicitly discussed in the context of a particular example or embodiment. For example, in discussing a vehicle tray per se, device, system, and/or method embodiments are also included in such discussions, and vice versa.

Furthermore, various modifications and combinations can be derived from the present disclosure and illustrations, and as such, the following figures should not be considered limiting.

As illustrated in FIG. 1, a tray, indicated generally at 10, in an example implementation in accordance with the technology is provided for use in a vehicle and capable of carrying or supporting food, beverages and any of a variety of other items, such as personal items, a map, a global positioning system (GPS), a mobile phone, or any of a wide variety of innumerable other objects.

The tray 10 may be formed of any of a variety of different materials including, but not limited to, wood, plastic, metal, composite and other materials and combinations thereof. The formation and/or assembly of the tray may be performed using any of a variety of technologies as may be understood by one having skill in the art. For example, a wood tray may be created by carving the tray from a single piece of wood or may be assembled by gluing, stapling, nailing press-fitting and so forth. As a specific example, a wall 12 circumscribing the tray may include interlocking wall sections. Also, each wall section may include a groove for receiving the edge of the bottom of the tray. A metal tray may be created through machining, molding, bending, welding or the like. Plastic or composite trays may be created through blow-molding, snap-fitting, gluing or the like. Any of a variety of other methods of manufacture may also be used.

The tray 10 may be fashioned in a variety of shapes or sizes. The tray 10 may generally include a bottom 14 and side walls 12 circumscribing the bottom. The side walls 12 may be short so as to form a small lip around the periphery of the tray or may be taller such that the tray may be more box or container like. In the example illustrated the tray 10 is rectangular shaped. Square, circular, oval, polygonal and other shapes may also be used. However, a quadrilateral shape, such as a square or rectangle, for example, may be preferable in some implementations over other shapes in order to efficiently use space occupied by the tray and provide a surface area of the bottom that is not minimized by curvature or the like. In one example, the tray 10 may have dimensions of approximately 10.5 in. by 14.5 in.

The tray 10 may include one or more apertures 16, holes or recesses such as may be used for supporting a beverage. As illustrated, the tray 10 may be devoid of structure below the apertures 16 for supporting a beverage and may rely on an angular or inclined outer periphery of the beverage container to be supportable in the aperture 16. In another example, additional structure may be included below the aperture 16 to support a beverage, as may be recognized by one having skill in the art. The apertures 16 may be similar in diameter to existing built-in vehicle cup holders or similar in diameter to an average beverage container diameter. The bottom 14 of the tray 10 may be formed with the apertures 16 included or may be modified after formation to include the apertures 16. For example, in the case of a wood tray, the apertures 16 may be cut or drilled from the bottom 14 of the tray 10 after the bottom 14 is formed.

When multiple apertures 16 are included in the tray 10, the apertures 16 may have a same or different size as one another. Use of the tray 10 in a vehicle carrying a single occupant or driver may benefit from the inclusion of a plurality of apertures 16 to enable the driver to have multiple beverages or a beverage and a soup, for example. Furthermore, a tray 10 with multiple apertures 16 may enable a second occupant in the vehicle to use one aperture for a beverage while the driver uses a different aperture.

The tray 10 may be well suited for commercial or large vehicle use, such as in a semi truck. Many truck drivers may consume a meal while driving to increase efficiency in traveling from one destination to another in a timely manner and within statutory or other driving time constraints. In one aspect, a menu for a truck driver may be designed around the tray. While the tray may accommodate any of a variety of meal configurations, a truck stop may sell menu items designed specifically with the present vehicle tray in mind. For example, menu items may be selected for easy consumption while driving. Also, menu items may be served in a box shaped to fit within the walls surrounding the tray. Beverage containers included in a meal may be sized and tapered to fit the apertures in the tray. The meal may be made available in an insulated carton or container sized to fit in or over the top of the tray. In another aspect, an insulated box or cover may be available for sale separately from or included with the meal or the tray. In one example, illustrated in FIG. 9, the insulated cover 50 may be sized to fit within the tray without extending over the apertures such that a hot meal will not heat a cold beverage. In another example, the insulated cover 52 may be sized to also cover the apertures, such as to keep a cold beverage cool along with other cool meal items. In yet another example, illustrated in FIG. 10, the insulated cover 54 may include a plurality of compartments such that a cool beverage may be insulated from the cab of the truck and also from a heated meal or such that hot soup may be insulated from a cool meal.

Figure 9:
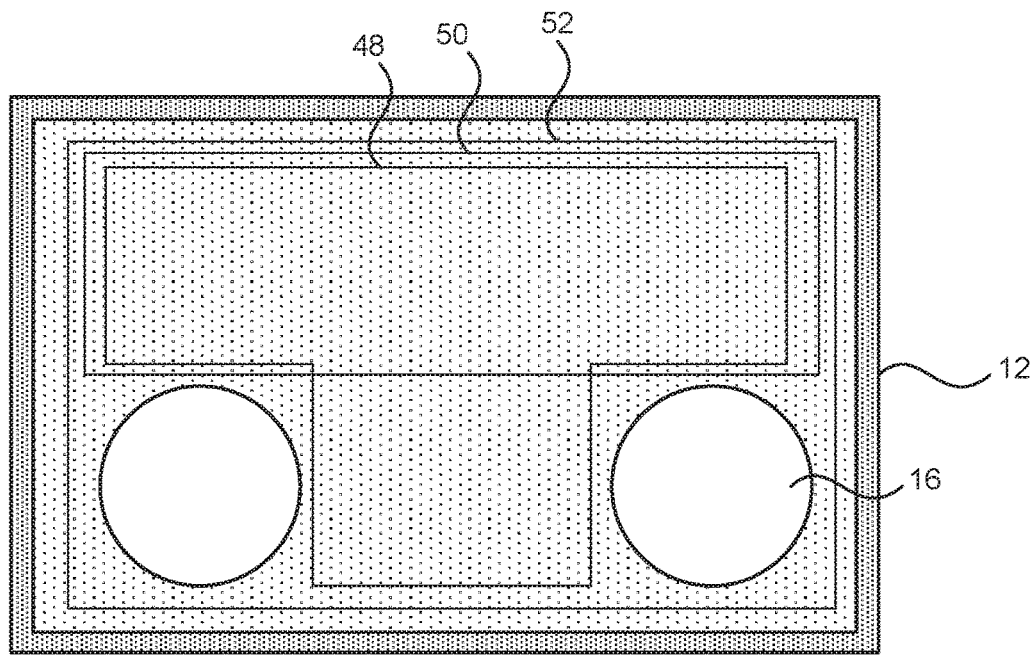
FIG. 9 is a top view of a tray illustrating outlines of example cover configurations in accordance with an embodiment of the present technology.
Figure 10:
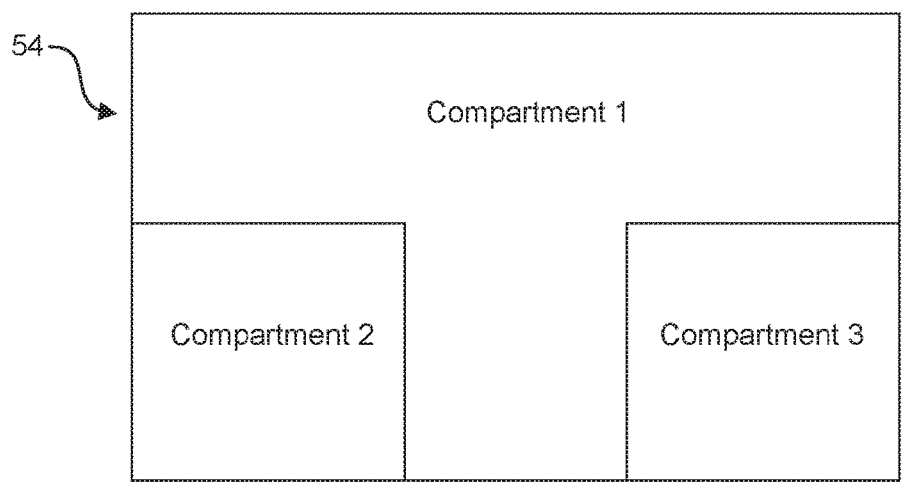
FIG. 10 is a cross-sectional top view of a cover for covering a tray including a plurality of insulated compartments in accordance with an embodiment of the present technology.
Figure 11:
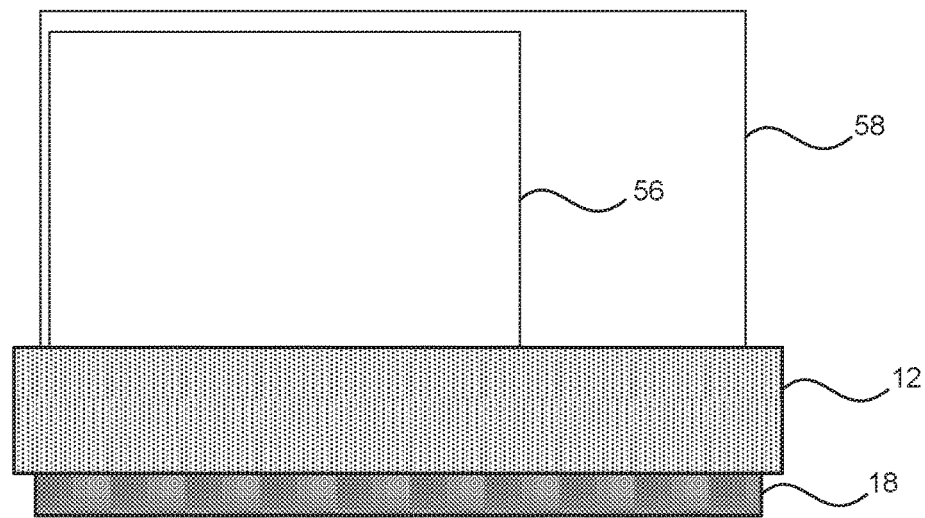
FIG. 11 is a side view of a tray illustrating outlines of example cover configurations in accordance with an embodiment of the present technology.
Figure 12:
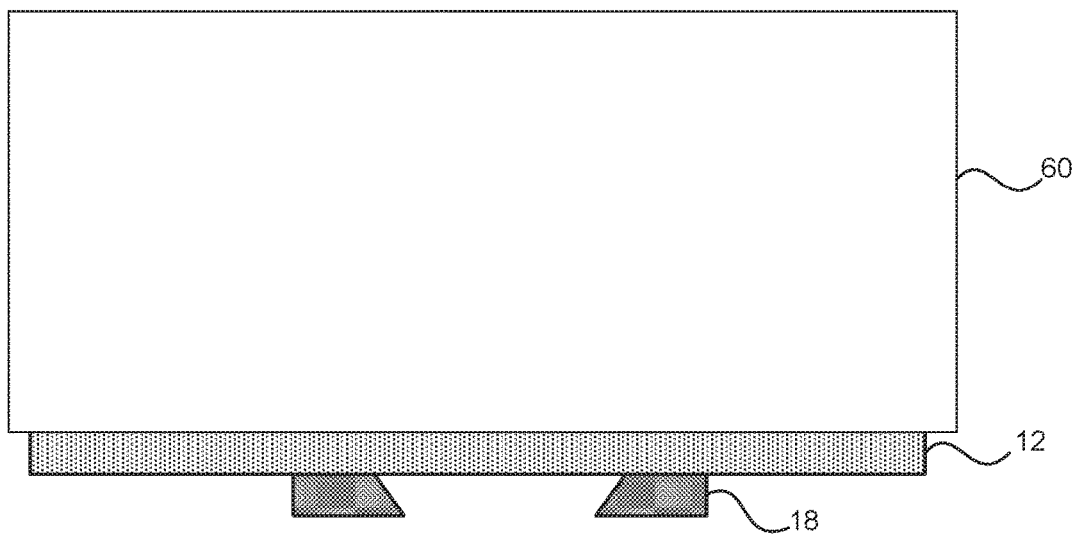
FIG. 12 is a front view of a tray illustrating a cover configuration extending around a periphery of the tray in accordance with an embodiment of the present technology.

FIG. 9 illustrates outlines of a plurality of insulated cover shapes and configurations within that may be sized to fit within the walls surrounding the bottom of the tray. One exemplary configuration not described above is a configuration in which the insulated cover 48 extends across a portion adjacent to a side of the apertures and also extends between the apertures. FIG. 10 illustrates an insulated cover configuration including three separate compartments for separately insulating food, beverages, soup, etc. FIG. 11 illustrates a side view of the tray with outlines of different example cover configurations 56, 58 sized to fit within the tray walls 12. FIG. 12 illustrates a front view of the tray with a cover 60 having larger length and depth dimensions than the tray. In other words, the cover may extend around a periphery of the tray.

An insulated cover may be manufactured from any of a variety of insulating materials or combinations of materials and may be formed in any suitable shape or size. For example, while the drawings illustrate a cubic insulated cover, a cover with a quadrilateral shaped cross section near an open end may have a closed or upper end that is hemispherical, pyramidal or otherwise shaped differently than the open end. The insulated cover may be formed from fabric, foam, plastic, or any of a variety of other suitable materials.

As illustrated in FIGS. 5a-7b, a tray system may include a base 26 sized and shaped to fit within a vehicle cup holder. The tray 10 may be attachable to the base 26 and repositionable on the base to different positions (see FIG. 7b). The base 26 may be formed of a same or similar material as the tray or may be formed of a different material. The base 26 may support the tray 10 through attachment to the tray 10 and by positioning the base 26 within a vehicle cup holder.

Figure 6A:
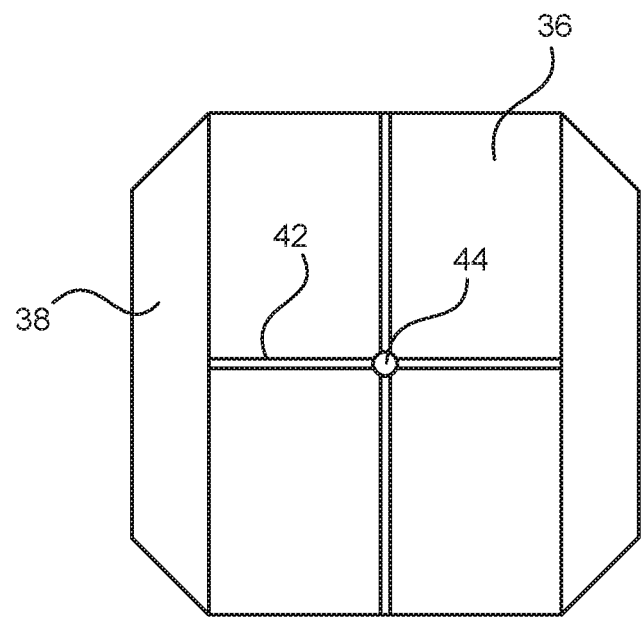
FIG. 6a is a top view of a base for supporting a tray in accordance with an embodiment of the present technology.
Figure 6B:
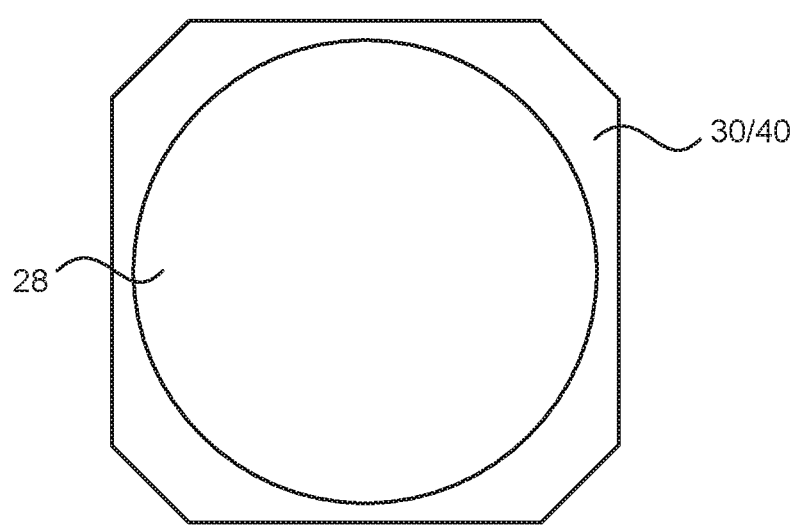
FIG. 6b is a bottom view of a base for supporting a tray in accordance with an embodiment of the present technology.

The base 26 may include a lower portion 28 and a shoulder portion 30. The lower portion 28 may have a circular cross-sectional shape and the shoulder portion 30 may have a polygonal cross-sectional shape, as illustrated in FIG. 6b. The shapes of the lower portion 28 and shoulder portion 30 may be configured in any suitable shape, however, and may differ from those illustrated or described. However, a circular shape for the lower portion 28 may be preferable in order to maximize occupancy of the lower portion within a circular cup holder, which may increase the degree of securement of the lower portion within the cup holder. The polygonal cross-sectional shape of the shoulder portion 30 may be configured to support the tray 10, while also providing a grippable surface and attractive design.

The shoulder portion 10 of the base 26 may have a greater cross-sectional width than the lower portion 28. The greater cross-sectional width may prevent the base 26 from passing through a cup holder when the cup holder is open at the bottom, similarly as the cup holders in the tray 10 illustrated. The lower portion may be tapered with a taper 32. The base 26 may further include a tapered transition portion 40 transitioning from the circular cross-sectional shape to the polygonal cross-sectional shape with the greater cross-sectional width. For example, the tapered transition portion 40 may be rounded and tapered as illustrated in FIGS. 5a-5b. The rounded taper may be shaped to approximate the shape of an edge of a sphere superimposed between the lower portion and the shoulder portion with a central axis through the sphere aligned with a vertical central axis of the base, where the spherical shape is represented on the tapered portion 40 alone without extending to the lower portion 28 or the shoulder portion 30.

Figure 5C:
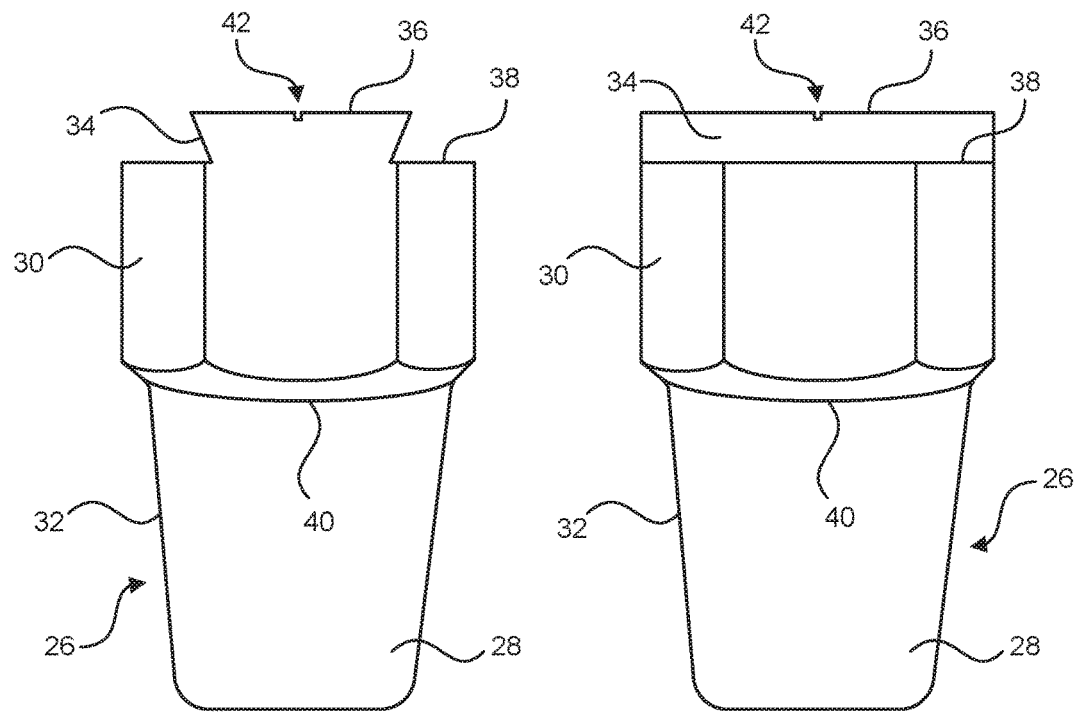
FIG. 5c illustrates a plurality of bases having shoulder portions of different heights in accordance with an embodiment of the present technology.
Figure 5C:
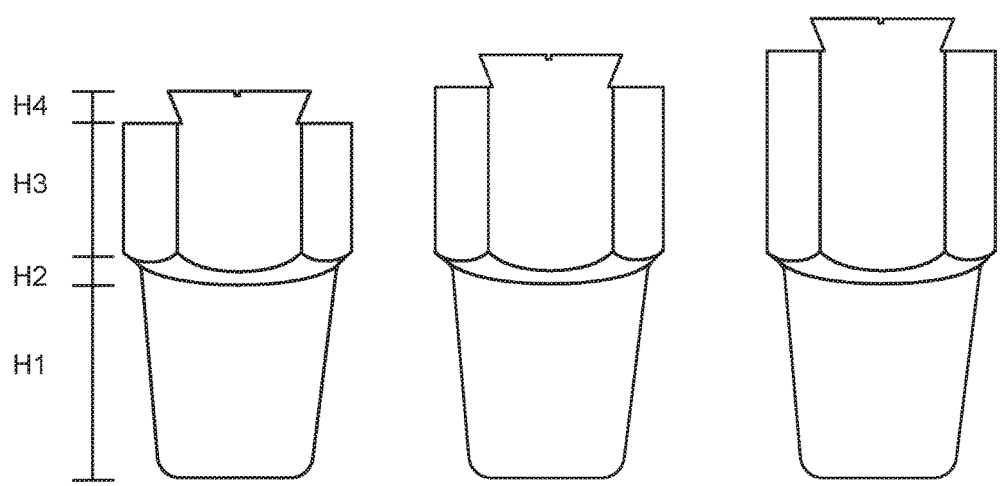

In one example, the lower portion 28 of the base 26 may be sized and shaped to fit within the apertures 16 in the tray 10. For example, while the present technology may be implemented using a single base 26 to support the tray 10, the technology may be available as a kit including a plurality of bases. The bases may have a same or similar lower portion height H1 and tapered transition portion height H2 (as well as track insert height H4), but may have differing shoulder portion heights H3, as illustrated in FIG. 5c. The differing shoulder portion heights H3 may permit the tray 10 to be positioned at different heights within the vehicle with respect to the cup holder by which the base 26 is supported. Inclusion of the plurality of bases in a kit may allow a user to swap the base for a different base as desired, such as if a different height is desired or if the tray is moved to a different vehicle for which a particular height base is not well suited. In another example, the plurality of bases in a kit may allow the user to support the tray 10 using one of the bases and to block one or more of the apertures 16 in the tray 10 using one or more other bases. For example, although the apertures 16 may be suitable for a beverage container or other container, such a container may not be constantly available or positioned in the aperture(s) and the tray may be used to support food or other items which may slide, roll or otherwise move around on the tray as the vehicle is driven. Placement of a base 26 into the aperture 16 may block the aperture 16 and prevent such items from falling through the aperture 16 and onto the floor of the vehicle, which in turn increases safety of the driver who will not be distracted by falling items or trying to find items which have fallen.

The apertures 16 in the tray 10 may be positioned near one or more edges or walls 12 of the tray such that a distance between the aperture 16 and the wall 12 is at least as great as a difference between a widest diameter of the lower portion 28 of the base 26 and a diameter of the shoulder portion 30 of the base 26. For example, the distance may be approximately equal to the difference or may be from about 1 to 15 mm greater than the difference. Positioning the apertures 16 at such a distance from the tray wall(s) 12 may ensure that the base 26 easily fits within the aperture 16 but a majority of the tray bottom 14 is unobstructed by the base.

Referring to FIGS. 1-4b, the tray 10 may include a track 18 formed in a bottom 14 of the tray 10 or attached to the bottom 14 of the tray 10. The tray 10 may be slidably attachable to the base 26 along the track 18. For example, the base 26 may include a track insert 36 sized and shaped to fit within the track 18. The track 18 may have one or more open ends for receiving the track insert 36. The track 18 and the track insert 36 may be dovetailed to fit together by inserting the track insert into an open end of the track. In other words, sides 24 of the track insert 34 and the track 18 may extend at an oblique angle with respect to a top 38 of the base 26 or the bottom 14 of the tray 10, respectively. In other words, the sides 24 may be dovetailed or in a dovetail configuration. Other configurations may include a T-cut shape, a squared shape, or any other suitable configuration. It is noted that a shape of the base (see FIG. 5a), or at least a portion of the base configured to interface with the track 18, may be sized and shaped to interface with the track 18 based on a size and shape of the track 18, including the sides 24 of the track.

A height of the track insert 36 may be less than a width and/or length of the track insert 36. For example, while the shoulder portion 30 of the base 26 may be essentially quadrilaterally shaped (even if corners are cut to form an octagon or irregular shape), the track insert 36 may extend along a full distance of one of a width or length of the shoulder portion 30, and may be formed by cutting away opposing sides in another one of the width or length of the shoulder portion 30. In other words, and as illustrated in FIG. 6a, the width of the track insert may be less than a length of the track insert.

The base 26 may include a shoulder portion 30 having a planar surface 38 for supporting the tray 10 by supporting the track 18. A bottom of the track 18 may be planar to rest upon the planar surface 38 of the shoulder portion 30. Alternately, or in addition, the track insert 36 may provide a planar surface upon which the tray may rest or slide.

Figure 2:
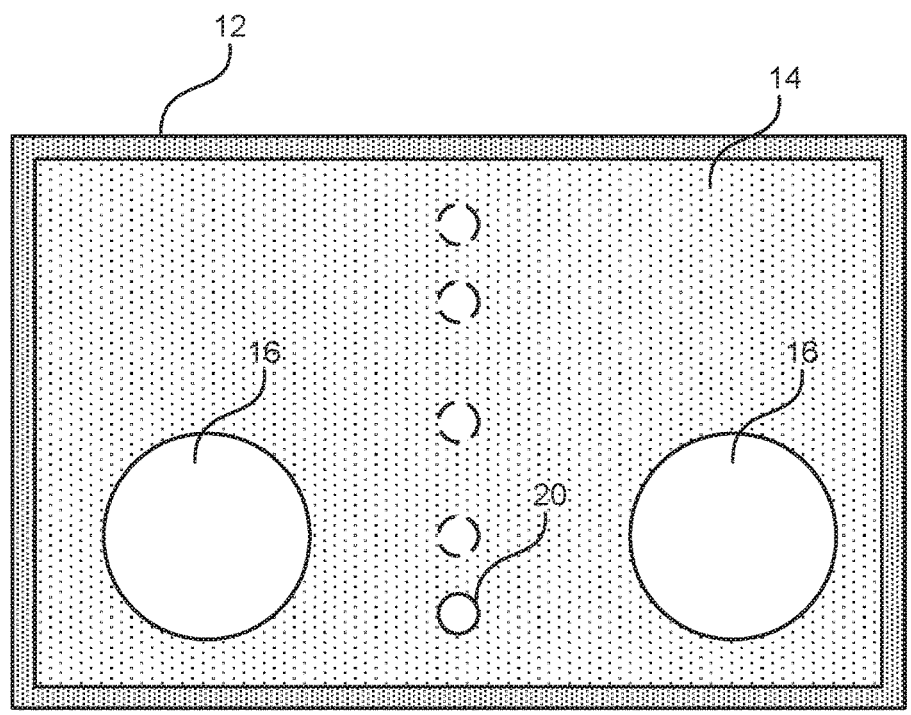
FIG. 2 is a top view of a tray in accordance with an embodiment of the present technology.
Figure 3:
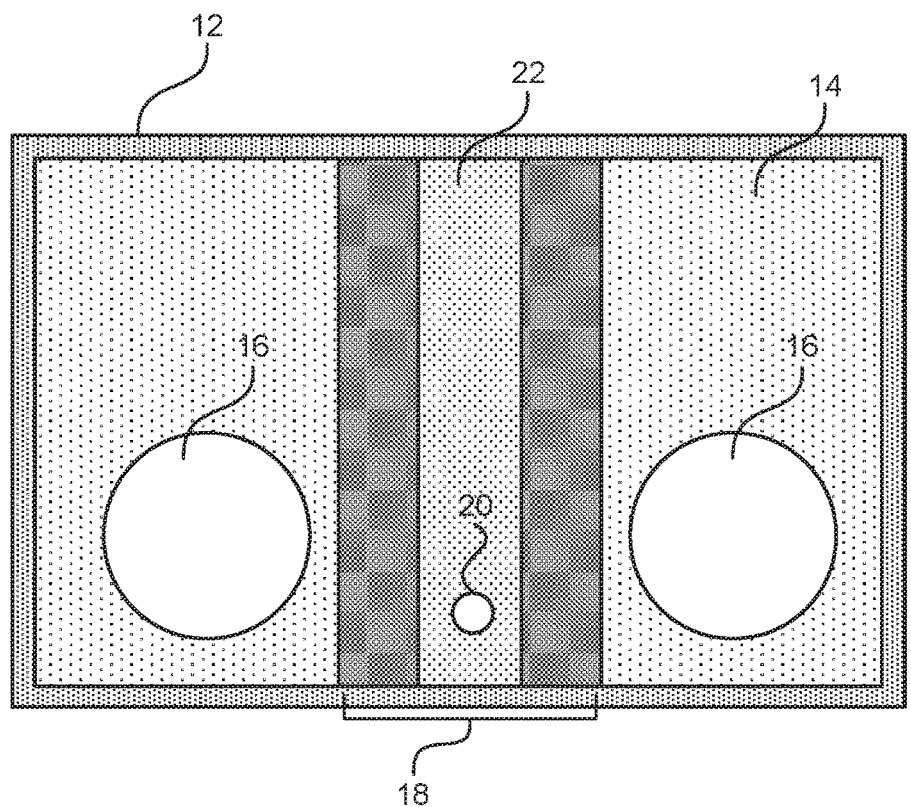
FIG. 3 is a bottom view of a tray in accordance with an embodiment of the present technology.
Figure 7A:
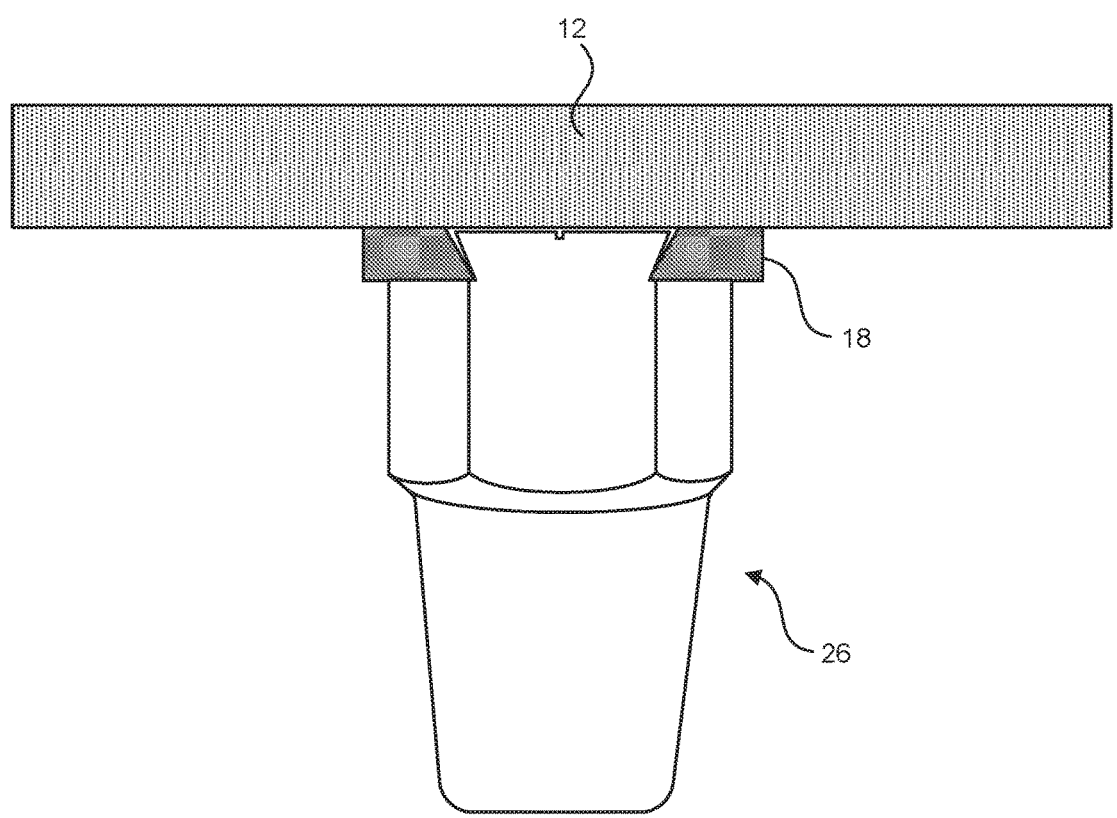
FIG. 7a is a front view of a base supporting a tray in accordance with an embodiment of the present technology.
Figure 7B:
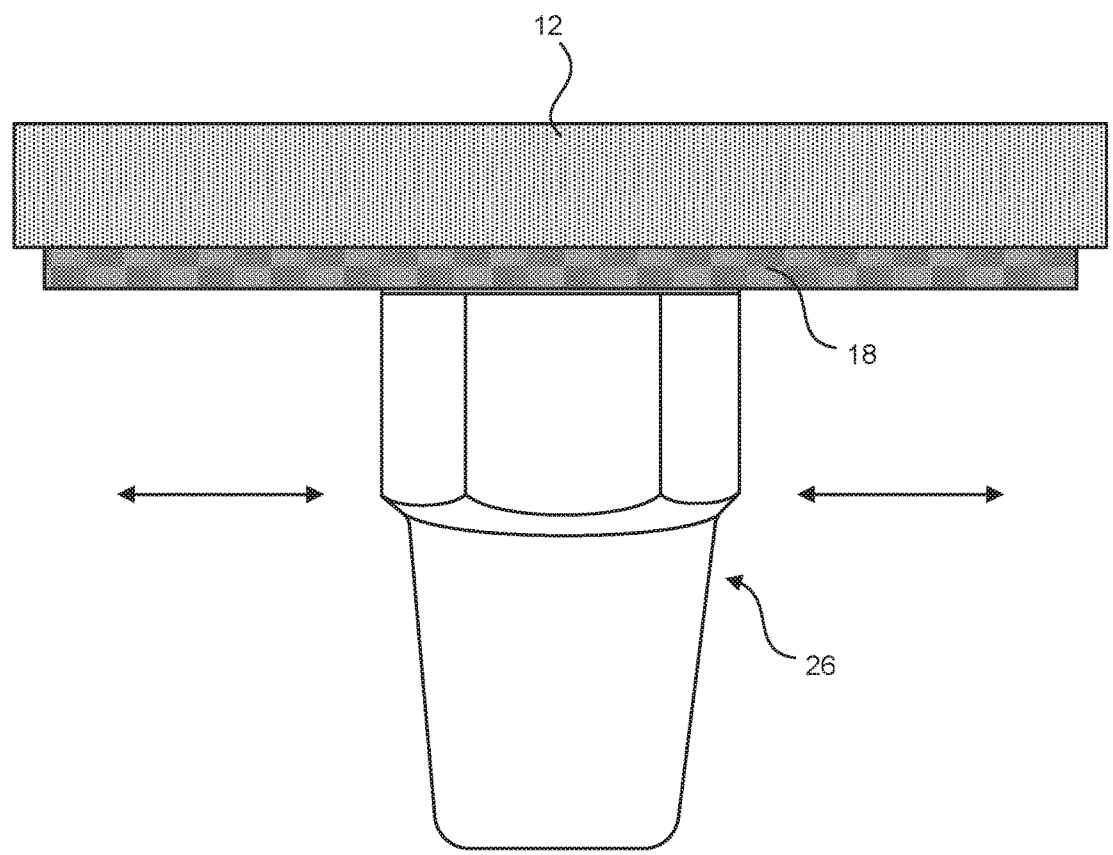
FIG. 7b is a side view of a base supporting a tray in accordance with an embodiment of the present technology.
Figure 8:
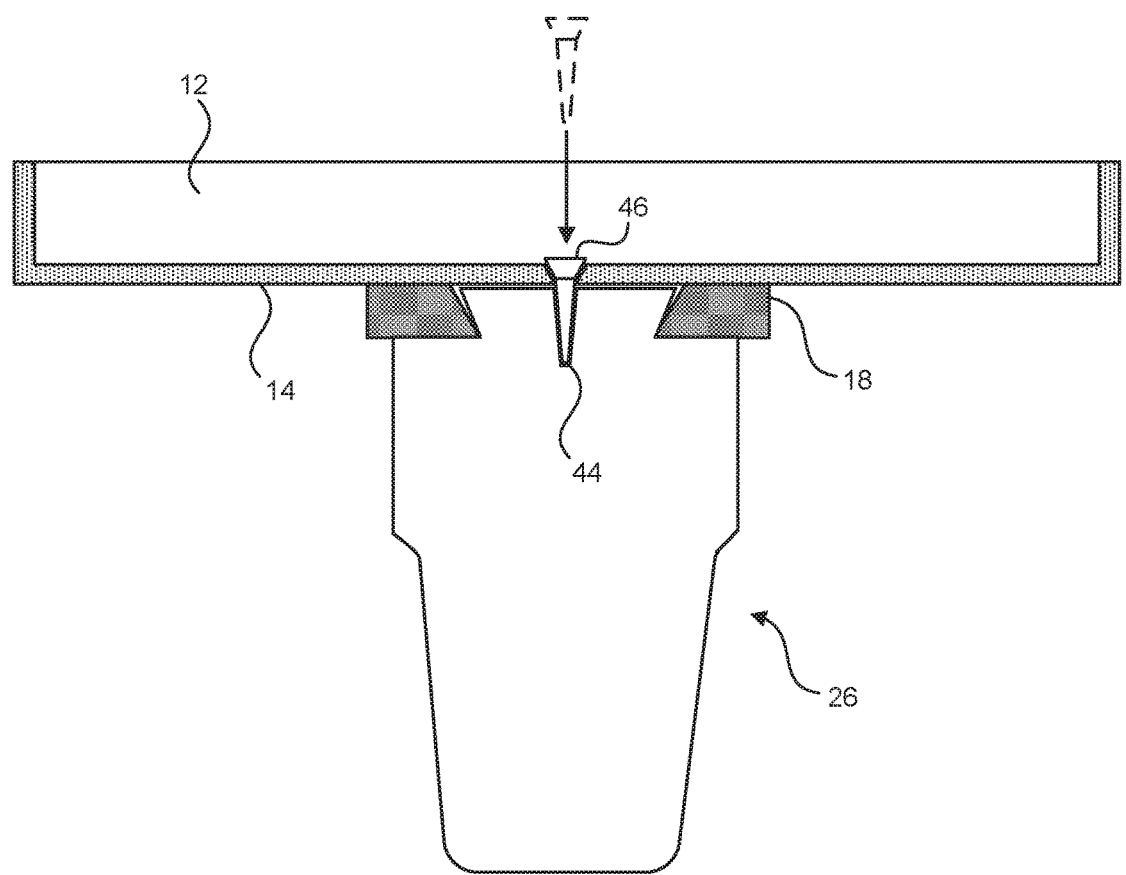
FIG. 8 is a cross-sectional front view of a base supporting a tray, including a securing device securing the tray to the base in accordance with an embodiment of the present technology.

The base 26 may be slidably repositionable within the track 18. The tray 10 may include or be configured to receive a securing device 46, as illustrated in FIG. 8. For example, a securing device 46 may be insertable through a bottom 14 of the tray 10 into the base 26 to secure the tray 10 to the base 26. For example, the securing device 46 may be peg, a nail, a screw or any of a number of other devices. Any of a variety of securing devices may suffice, but to minimize cost and ease of replaceability if the securing device were not attached to the tray and were to be misplaced, the securing device 46 may be a common golf tee or other similar inexpensive and easily replaceable device. The tray 10 may include a securement aperture 20, as illustrated in FIGS. 2-3, through which the securing device 46 may be passed into a top of the base 26, or rather into the track insert 36. The track insert 36 may have a recess 44 to receive the securing device 46 (see FIGS. 6a and 8). The track 18 may be shaped to prevent movement of the tray 10 upon the base 26 in a vertical direction through dovetailing and in a first lateral direction due to the presence of the side walls 24 of the track 18. Use of the securing device 46 may secure the tray 10 from movement in a second lateral direction perpendicular to the first lateral direction. The second lateral direction is illustrated in FIG. 7b by arrows extending from the base 26 along the direction of the track 18. Thus movement of the tray 10 upon the base 26 may be prevented in x, y and z dimensions.

The bottom 14 of the tray 10 may include one or more securement apertures 20 to enable securing the base 26 within the track 18 at any of a number of different positions. The example illustrated in FIG. 2 illustrates a plurality of optional securement apertures spaced across the bottom 14 of the tray 10. The securement apertures 20 may be permanently formed directly in the bottom 14 of the tray 10 or may be formed as perforations, removable/replaceable plugs or any other suitable configuration to enable a user to open and/or close specific apertures as desired. In another example, the tray 10 may be made of a material suitable for the user to form one or more securement apertures 20 at a desired location. In one example, the tray 10 may be positioned on the base such as to be substantially flush or adjacent to an instrument panel, console or the like in the vehicle, which may provide additional stability to the tray. A user may insert a securing device 46 into an appropriate securement aperture 20 to position the tray on the base relative to structure in the vehicle as desired.

The securing device 46 may become fixed in position when inserted, such as by gluing or snapping the securing device into position, or such as by inserting a nail or screw through the tray 10 into the base 26, but may preferably be easily removable, similarly as with use of a golf tee to enable easy disassembly and/or reconfiguration of the tray and base.

In one example, the track insert 36 of the base 26 may include the recess 44 as well as one or more grooves 42 (see FIG. 6a, for example). The grooves 42 may be stylistic, may be used to center the recess when forming the recess or may be configured to partially receive the securing device 46 as the base 26 is slid along the track 18. When the base 26 is positioned such that the securing device 46 is over the recess 44, the securing device 46 may more fully extend within the track insert 36 to fully secure the tray 10 and the base 26.

Figure 4A:
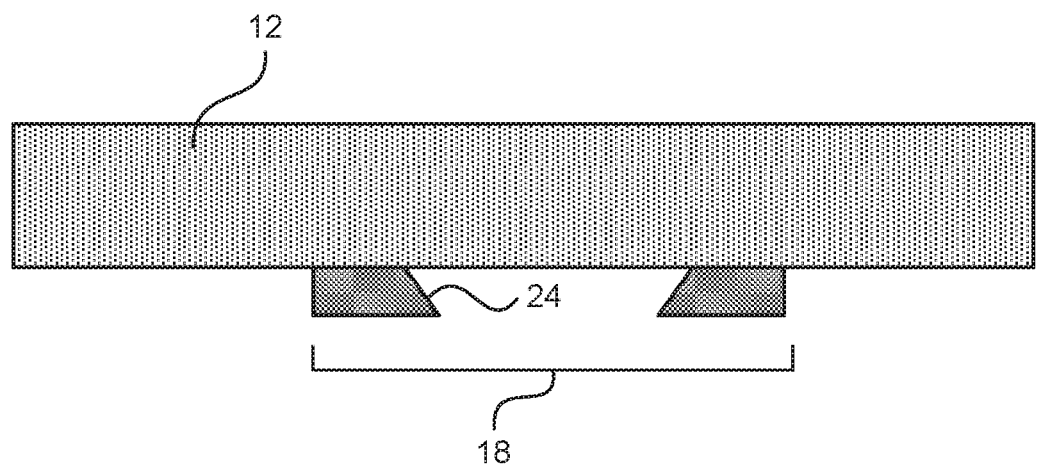
FIG. 4a is a front view of a tray in accordance with an embodiment of the present technology.
Figure 4B:
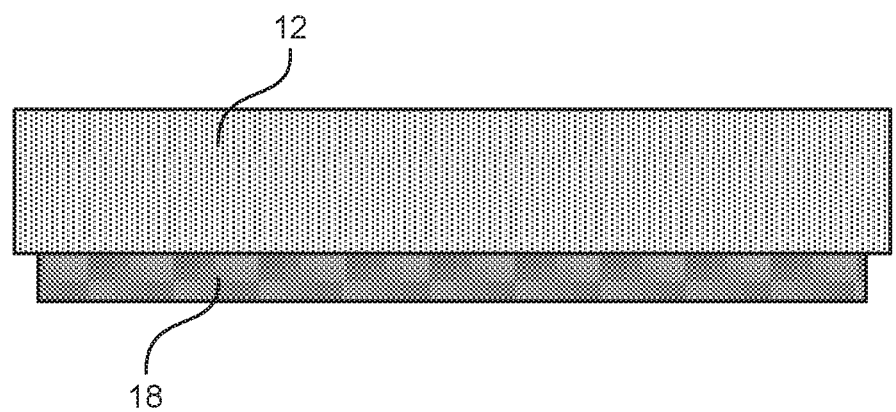
FIG. 4b is a side view of a tray in accordance with an embodiment of the present technology.

An inner portion 22 of the track 18 may be flush with the bottom of the wall(s) 12 surrounding the bottom 14 of the tray 10 (see FIG. 3). The tray wall 12 may circumscribe the edge or bottom of the tray 10 and may extend downwardly from the bottom of the tray, toward where the base may be when attached via the track. In other words, the bottom 14 of the tray 10 may be vertically inset from a bottom of the wall 12. The inner portion 22 of the track 18 may be flush with the bottom of the tray wall 12 extending downwardly from the bottom 14 of the tray 10. In one example, the track 18 may extend vertically from the inset portion of the track 18 inset into the bottom 14 of the tray 10 to an outer portion of the track 18 which may extend below the bottom of the wall 12 such that the track insert 36 may be easily inserted into the track 18, such as illustrated in FIG. 4a. The tray 10 may be repositionable on the base 26 at any position along an entire width or length of the track 18.

Figure 13:
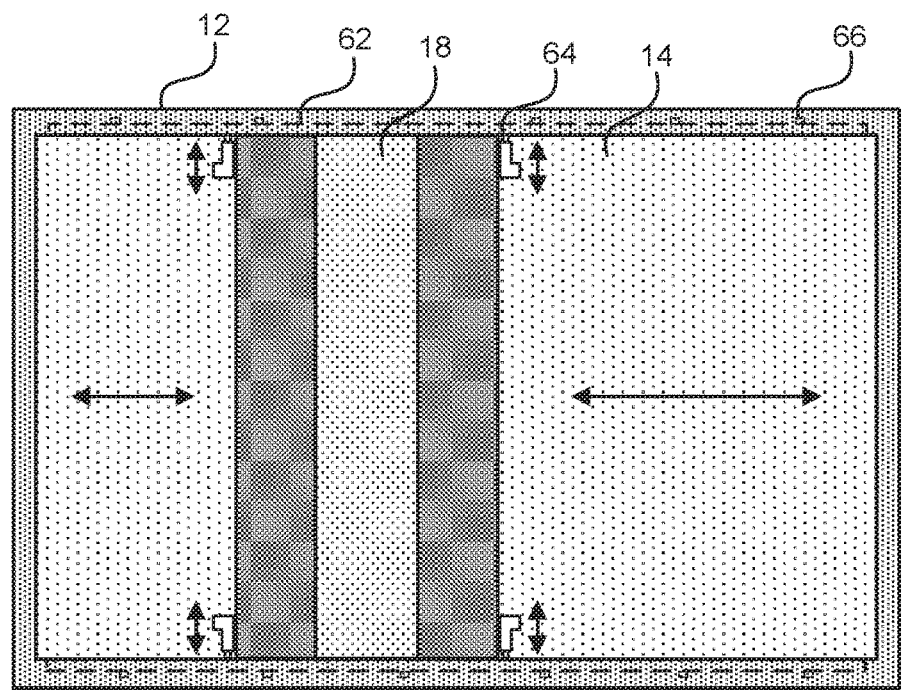
FIG. 13 is a bottom view of a tray having a moveable track in accordance with an embodiment of the present technology.

The track 18 may be repositionable along the bottom of the tray as illustrated in FIG. 13. For example, the portion of the tray wall 12 extending below the bottom 14 of the tray 10 may include a groove 62 along which the ends of the track can slide. In one aspect, two opposing tray walls may include the groove 62. Spring-loaded pins 64 with a protrusion for grippability may be attached to the track 18 and may snap into place in depressions 66 formed within the groove 62 to secure the track 18 in position within the groove 62. Other types of track securing devices other than spring-loaded pins may also be used to secure a position of the track 18. Also, the pins 64 may be interconnected such that a retraction of one pin or set of pins retracts other pins as well to increase the ease of repositioning the track 18.

Figure 14:
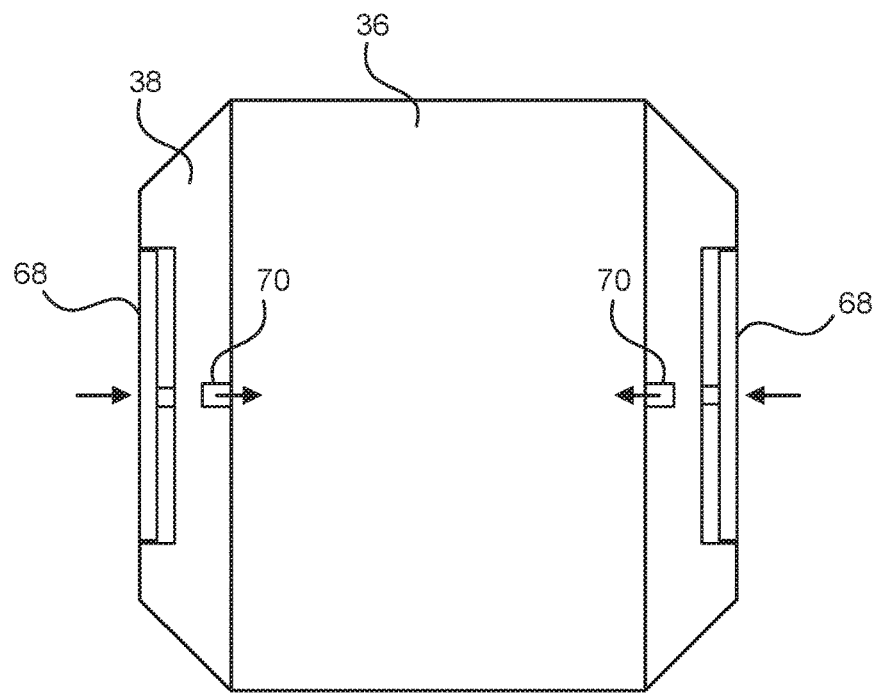
FIG. 14 is a top view of a base for supporting a tray having retractable pins that retract when plates are pressed and extend into a track in a tray to secure the tray to the base in accordance with an embodiment of the present technology.

In another example illustrated in FIG. 14, which depicts a top view of the base 26, the base 26 may include spring-loaded plates 68 and pins 70 to secure the position of the base 26 within the track 18 rather than using a securing device 46 extending through the bottom 14 of the tray 10. The track 18 may include depressions to receive the pins 70, similarly as the depressions 66 within the groove 62 described in the example above. When the plates 68 are pressed, the pins 70 may retract and when the plates 68 are released, the pins 70 may extend.

Figure 15:
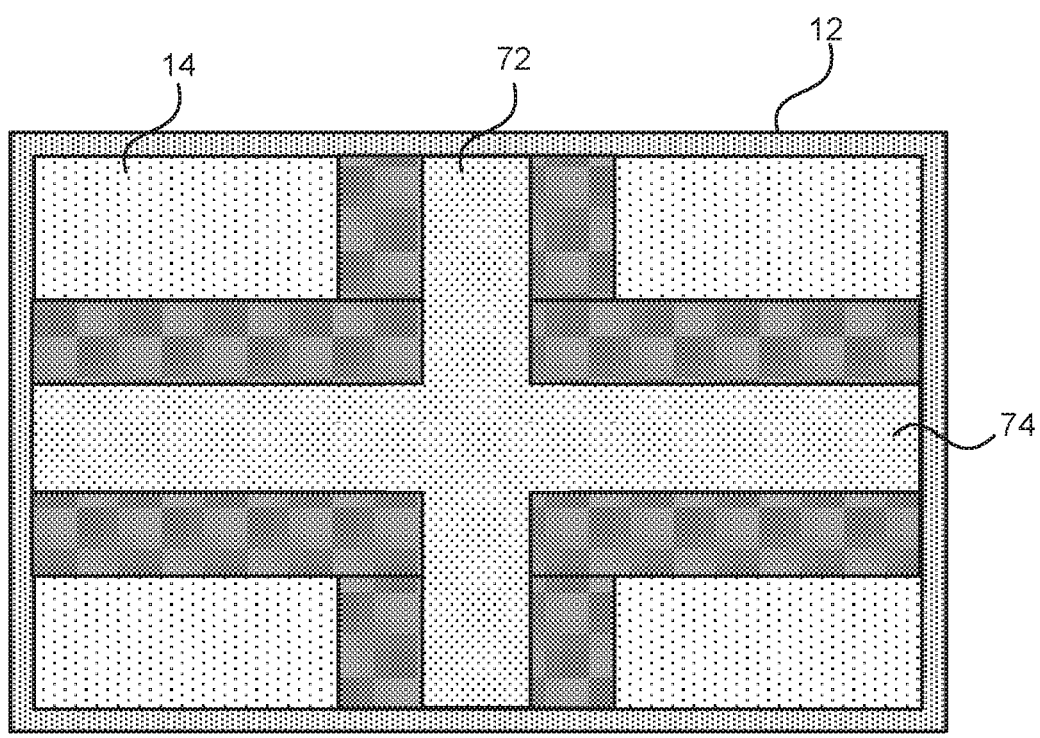
FIG. 15 is a bottom view of a tray having a plurality of tracks in accordance with an embodiment of the present technology.

The tray 10 may include a plurality of tracks. The plurality of tracks may be parallel or perpendicular to one another. FIG. 15 illustrates a bottom view of a tray including multiple perpendicular tracks 72, 74 formed along a bottom of the tray. As illustrated, the tracks 72, 74 may intersect. However, in other configurations, the tracks may also be configured to not intersect, such as by having one or more the tracks extend only partially across the bottom of the tray, either to where another track is formed or to a lesser distance. The tray may be slidably attachable to the base using any one of the plurality of tracks. A length of the track insert 36 on the base 26 may be greater than a width of an intersection of the plurality of perpendicular tracks 72, 74. In this configuration, even if the base were secured in middle of the intersection, a portion of the track insert 36 will also extend past the intersection to prevent lateral movement of the track insert 36 between tracks 72, 74. In other words, the side walls 24 of at least one of the tracks 72, 74 may at least partially abut the track insert 36 regardless of any positioning of the base 26 within the track 18.

In one example, a single base 26 may be used to support the tray 10. However, in some examples, a plurality of bases may be secured in one or more tracks and may be positioned in a plurality of cup holders to better support the tray. The plurality of bases may selected to have a same or different height, depending on the relative heights of the plurality of cupholders.

The technology may provide a method of using a tray system in a vehicle. The method may include using a tray system having a base and a tray. The base may include a track insert slidably receivable within the track. The track insert may have a length L, a width W and a height H with a relationship H<W<L. Walls extending along the height of the track insert may extend at an oblique angle with respect to a planar top of the base. A shoulder portion may be adjacent to the walls of the track insert and may be configured to support the tray about the track. A lower portion of the base may be sized and shaped to fit within a vehicle cup holder. The lower portion may have a different size and shape than the shoulder portion. The base may further include a transition portion having a taper tapering between the shoulder portion and the lower portion. The method may include positioning a base within a vehicle cup holder and coupling a tray to the base by sliding the tray onto the base. The method may further include securing the tray to the base by inserting a securing device through an aperture in the tray from a top portion of the tray into an orifice in the base.

Figure 16:
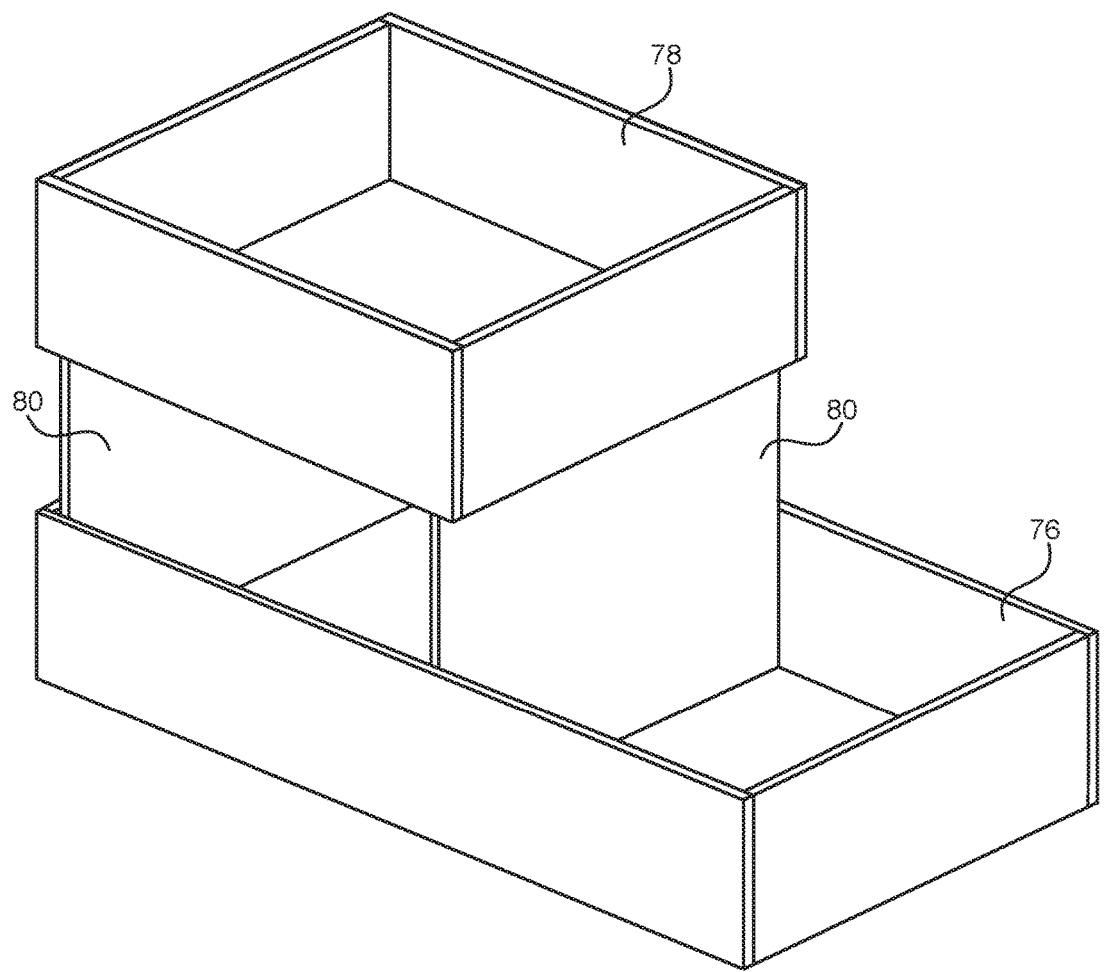
FIG. 16 is a perspective view of a tray with upper and lower tray portions in accordance with an embodiment of the present technology.

Referring now to FIG. 16, a tray including a plurality of tray portions 76, 78 is shown in accordance with an example of the present technology. The plurality of tray portions may include an upper tray portion 78 and a lower tray portion 76. The tray portions may be the same size or different sizes. While FIG. 16 illustrates the lower tray 76 as having a greater length than the upper tray 78, the upper tray 78 may alternatively be greater in length than the lower tray 76. Also, while FIG. 16 illustrates differing length tray portions, other dimensions may be varied, such as height or width. Although two tray portions are shown, the tray may include any desired number of tray portions, such as 3, 4 or more. The plurality of tray portions may be stacked vertically or otherwise. For example, the lower tray portion may serve as a base to a plurality of upper tray portions that are adjacent to one another rather than vertically stacked.

Apertures 16 (FIG. 17) for receiving beverage containers may be suitably located in any of the plurality of trays. For example, in FIG. 16 the apertures may be located in the lower tray portion at an end not covered by the upper tray portion. This configuration is illustrated in FIG. 17, which illustrates a top view of a tray with upper 78 and lower tray portions 76.

With continued reference to FIG. 16, the upper tray portion 78 may be supported by a panel or other tray support member 80, or plurality of tray support members. The tray support members 80 may be attached to the upper and/or lower tray portions 76, 78. The tray support members 80 may alternatively fit within slots in the upper and/or lower tray portions. The tray support members 80 may alternatively rest against the upper and/or lower tray portions 76, 78 without attachment or restraining devices. Any of a variety of other configurations which may be apparent to one of ordinary skill in the art are also contemplated and are considered to be within the scope of the present disclosure.

The use of upper and lower tray portions 76, 78 may server any of a variety of purposes. For example, use of multiple tray portions increases the area of the tray for holding food, beverages, personal articles and so forth. In one example, one or more of the tray portions may be sized and shaped to receive a warming or cooking appliance, such as a toaster oven or the like.

Figure 17:
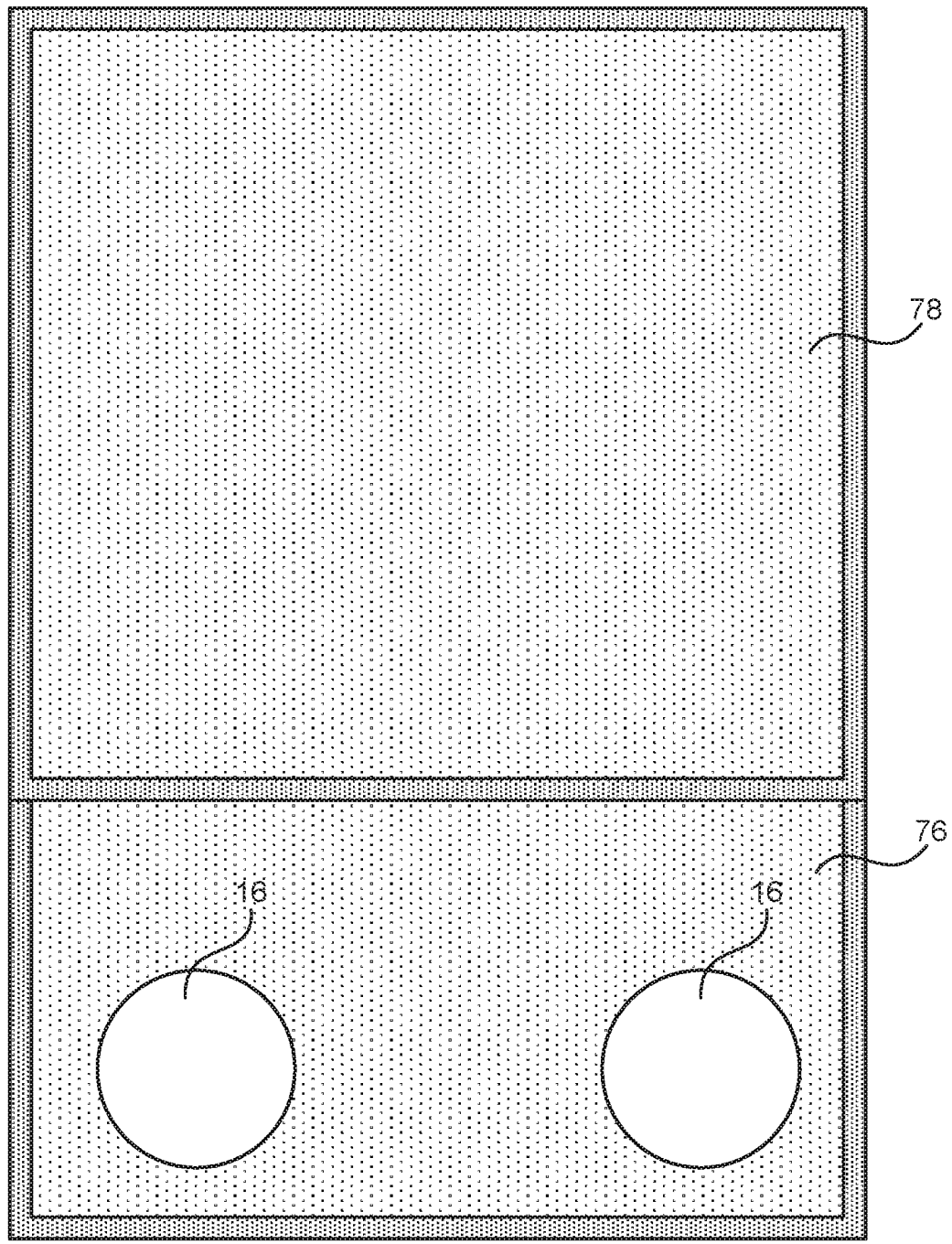
FIG. 17 is a top view of a tray having upper and lower tray portions in accordance with an embodiment of the present technology.

Referring now to FIG. 17, a top view of a tray including upper and lower tray portions 76, 78 is shown in accordance with an example. The upper tray portion 78 may have a similar shape as the lower tray portion 76, but be of different dimensions. In another example, the upper tray portion may comprise a different shape than the lower tray portion. Dimensions of the tray portions may vary to suit particular applications. In one example, however, the upper tray portion may have outer dimensions of approximately 14 inches in length and 10½ inches in width. The upper tray portion may comprise tray walls that are approximately ¼ inches thick and 1½ inches deep. The inner dimensions of the upper tray portion may be approximately 10 inches wide by 13½ inches long. The apertures 16 for receiving a beverage container may be approximately 3 inches in diameter. The dimensions of the lower tray portion may be similar to the dimensions of the upper tray portion, but the outer length of the lower tray portion may be approximately 17½ inches.

Figure 18:
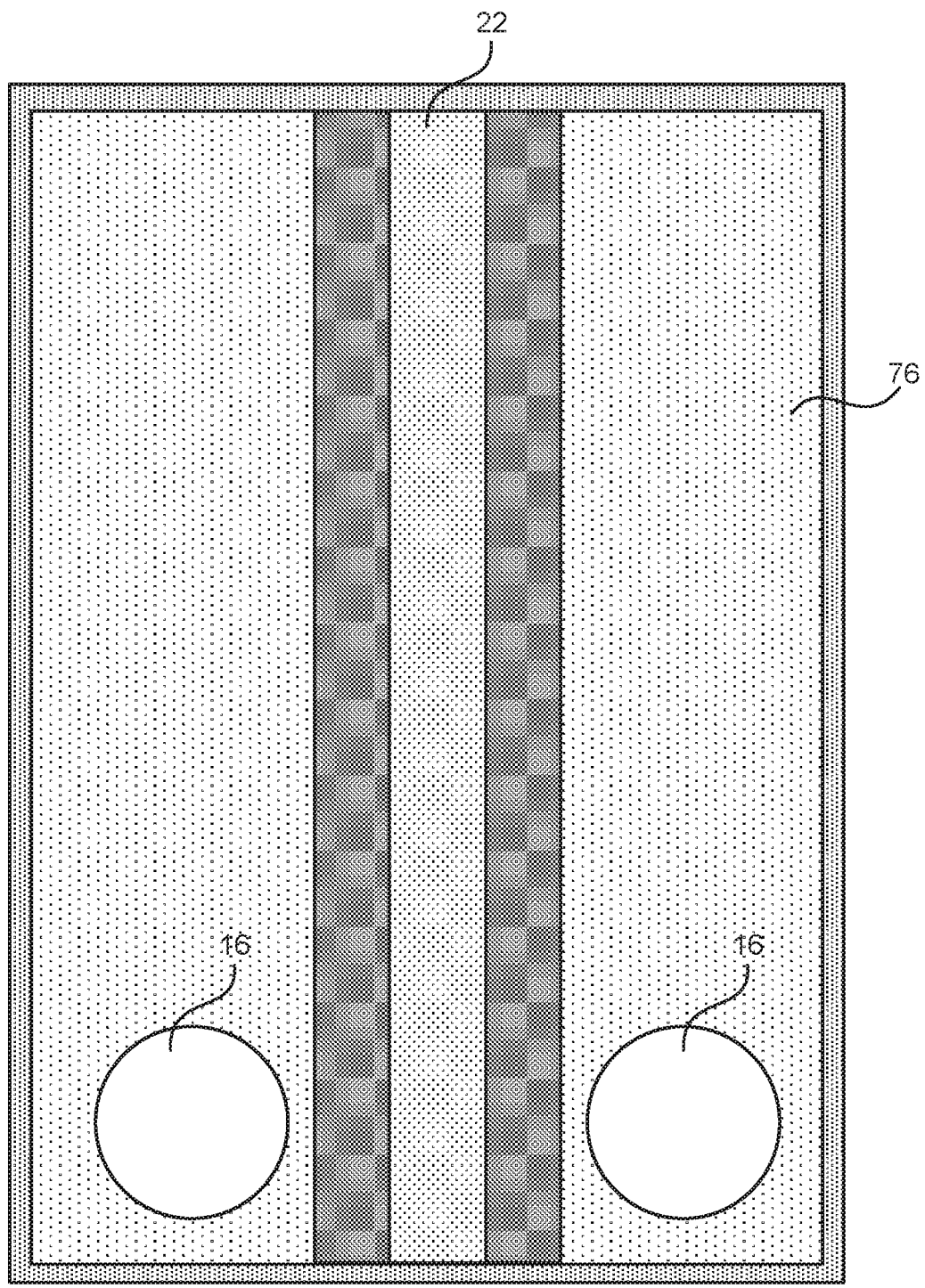
FIG. 18 is a bottom view of the tray of FIG. 17.

FIG. 18 illustrates a bottom view of the lower tray portion 76 of FIG. 17. The track 22 may comprise a dovetail post attachment. The dovetail post attachment may be formed of a different material than the tray. For example, if the tray is made of plywood, the dovetail post attachment may be formed of maple. Use of a hardwood such as maple for the dovetail post attachment may ensure longevity and stability of the tray upon the post, while use of a plywood for the tray may reduce an overall cost of production of the tray. The dovetail post attachment may have a depth of approximately ¾ inches, a width of approximately 4 inches, and a length of approximately 17 inches, where the length corresponds to a length of the lower tray portion. Alternatively, the length of the dovetail post attachment may be less than the length of the lower tray portion (inner or outer length). For example, the dovetail post attachment may have a length of approximately 14 inches to correspond to the outer length of the upper tray portion.

Figure 19:
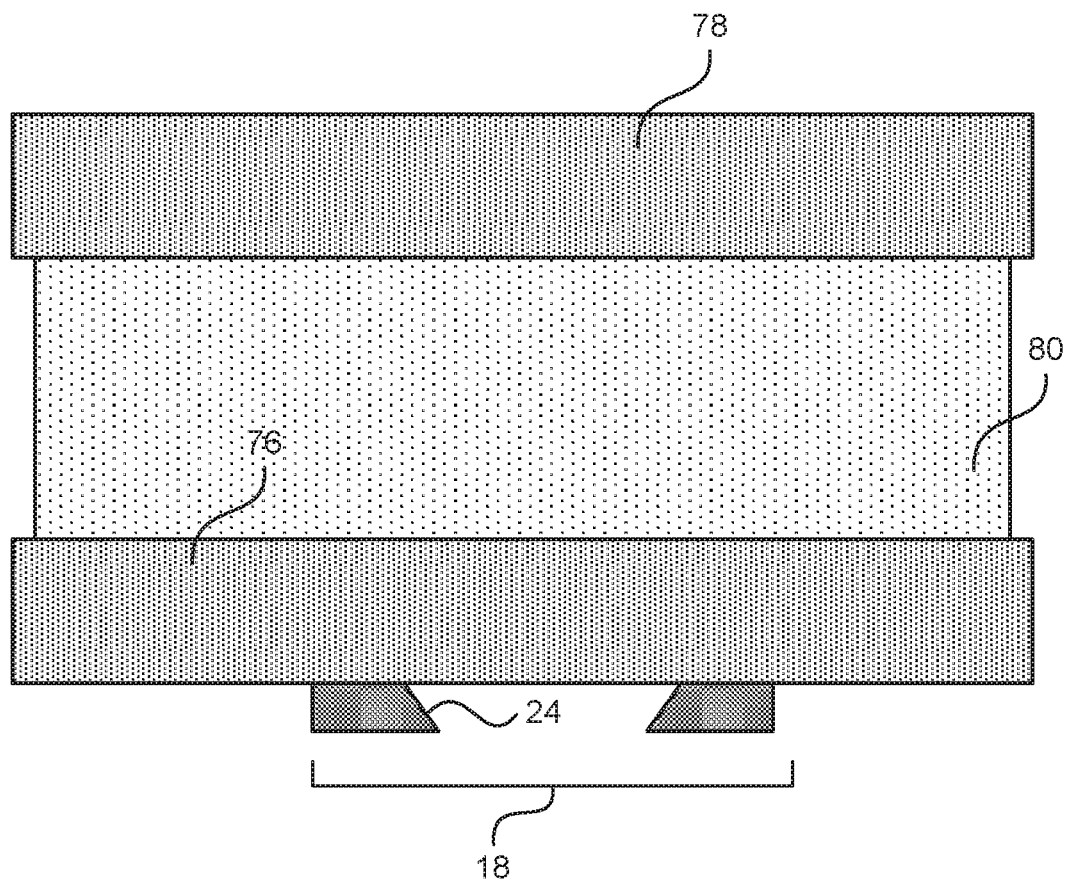
FIG. 19 is an end view of a tray having upper and lower tray portions in accordance with an embodiment of the present technology.

FIG. 19 illustrates an end view of a tray having upper and lower tray portions 76, 78. The view may be similar from either end of the tray. The track 18 with the dovetail post attachment 24 (e.g., angled sides of the track), the tray walls, and the tray support members 80 are visible in FIG. 19.

Figure 20:
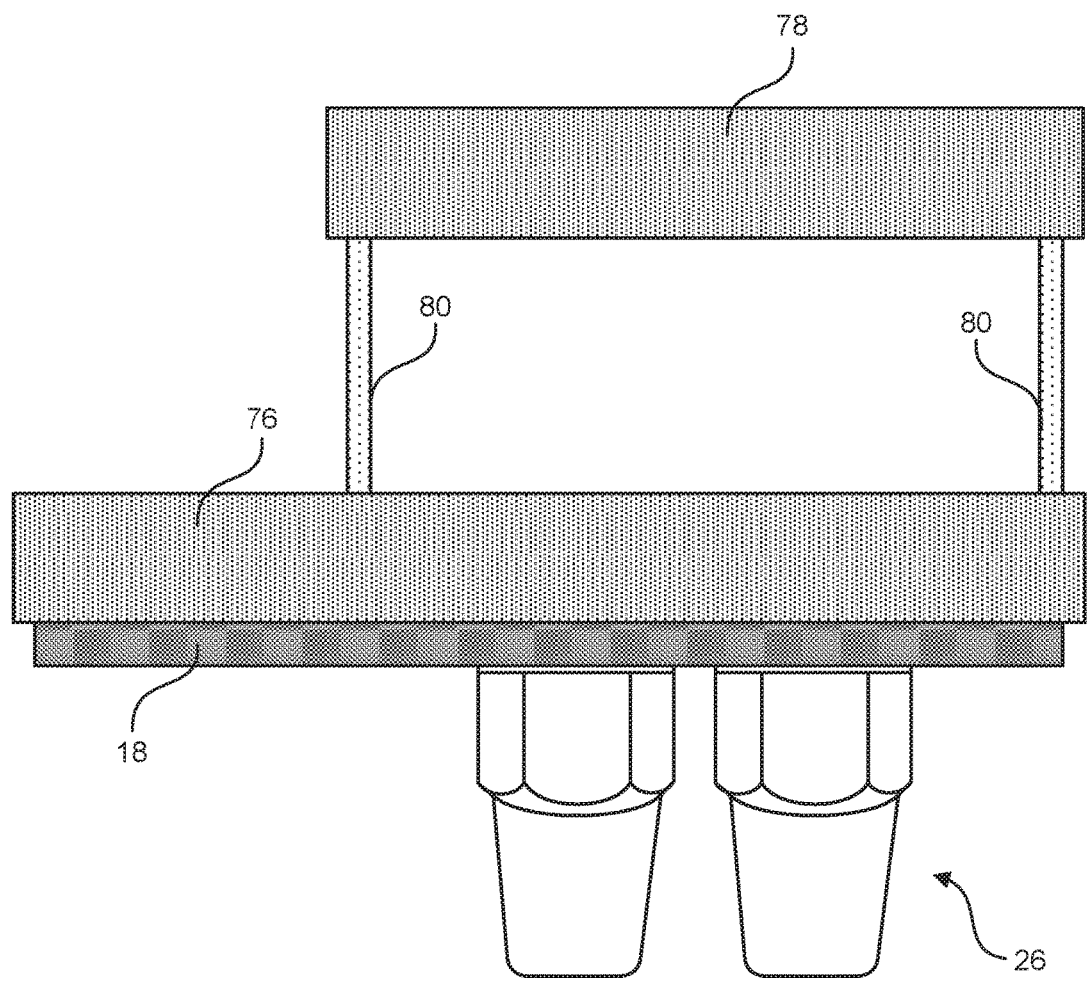
FIG. 20 is a side view of a tray having upper and lower tray portions supported by a plurality of bases in accordance with an embodiment of the present technology.

FIG. 20 illustrates an example side view of a tray having upper and lower tray portions 76, 78. The track 18, tray walls, and the tray support members 80 are visible in FIG. 20. Also shown are a plurality of bases 26 in the track, secured by the dovetail post attachment. In this example, the tray with the plurality of bases may be used in a vehicle having a plurality of cupholders aligned to accommodate the bases. While the tray support members are shown as being configured at opposing ends of the upper tray member, the tray support members may be otherwise configured. For example, rather than at lengthwise ends, the tray support members may be positioned at sides of the tray. Rather than having an opening between the trays as shown in FIG. 20, configuration of tray support members along the sides may result in openings at lengthwise ends of the space between the upper and lower tray portions. While the tray support members are illustrates as solid panels, the tray support members may be formed with patterned holes or the like to reduce weight and provide aesthetic appeal. Rather than panels, the tray support members may comprise posts to support the upper tray member. The posts may be located at corners or otherwise. Any other suitable configuration of tray support member may also be used.

Figure 21:
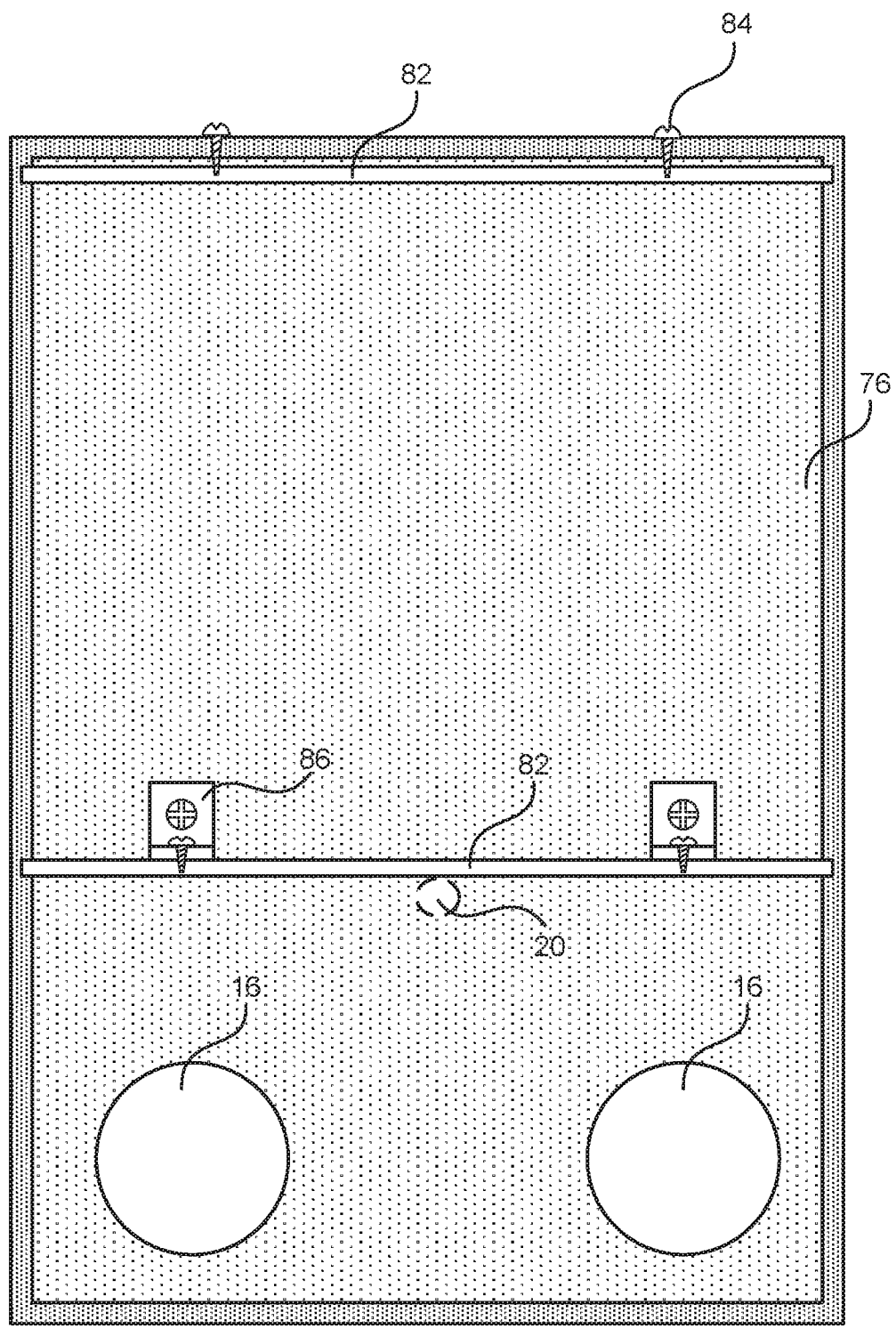
FIG. 21 is a cross-sectional top view of a tray having upper and lower tray portions in accordance with an embodiment of the present technology.

Referring to FIG. 21, a cross-sectional top view of a tray is illustrated in accordance with an example where the lower tray portion 76 supports an upper tray portion via tray support members. In one example, the lower tray portion may include one or more grooves 82 for receiving the tray support members. The tray support members may have approximately similar dimensions as the grooves 82 to securely fit within the grooves 82 of the lower tray portion 76. In another example, the tray support members may be secured to the lower tray portion such as by nails, screws 84, brackets 86, glue and/or any other suitable attachment device. In another example, the lower tray portion 76 may include a securement aperture 20 for receiving a securing device to secure a position of a base relative to the tray, as has been described previously. If the securing device does not rest flush with a bottom of the lower tray portion, then a protruding portion of the securing device can prevent the upper tray portion and tray support members from sliding along the lower tray portion in the absence of another retaining configuration. Any of the retaining configurations can be implemented individually or in combination with other retaining configurations. Various configurations not described or illustrated herein but which would be readily understood by one of skill in the art are also contemplated and within the scope of this disclosure. It is noted that any one or more of the retaining or restraining configurations for restraining movement of the tray support members with respect to the lower tray portion may also be used for restraining movement of the upper tray portion with respect to the tray support members.

The tray support members may be configured to be restrained with respect to the upper tray portion differently than with respect to the lower tray portion. For example, the tray support members may form portions of the upper tray portion walls and may be glued or otherwise attached to other walls or surfaces of the upper tray portion, while the tray support members may fit within grooves and/or be secured by screws or other attachment devices with respect to the lower tray portion.

Figure 22:
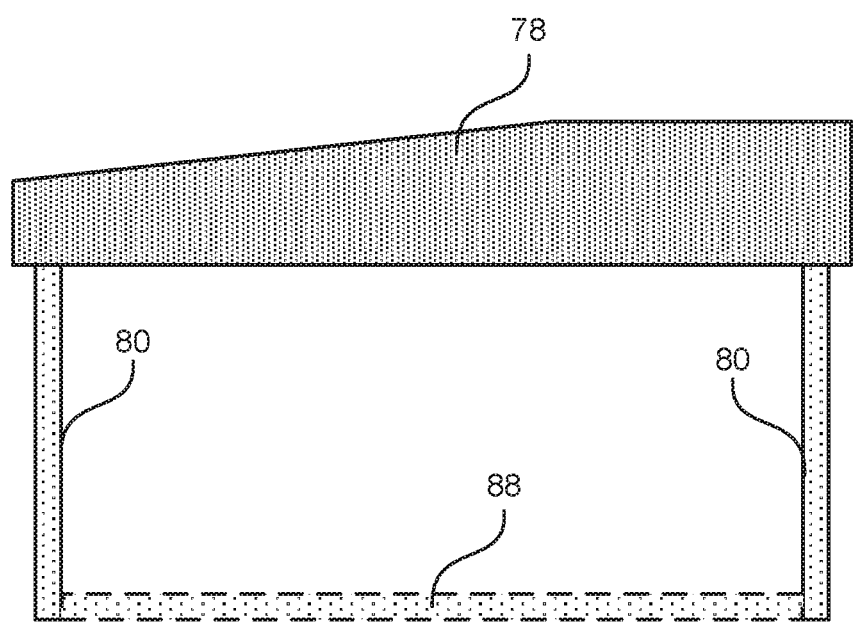
FIG. 22 is a side view of an upper tray portion of a tray in accordance with an embodiment of the present technology.

Referring to FIG. 22, a side view of an upper tray portion 78 with tray support members 80 is illustrated in accordance with an example. In this example, the side walls of the upper tray portion may be tapered towards one end to provide easier access to a vehicle occupant due to the increased height of the upper tray portion as compared with the lower tray portion. The lower tray portion, being at a lower height may benefit from having a non-tapered wall without hindering ease of access to items held within the lower tray portion. In addition to tapered side walls, one end wall of the upper tray portion may have a lower height than another end wall, with the lower height end wall having a height that corresponds to a tapered height of the sidewall.

FIG. 22 further illustrates that a cross-support member 88 may be used to provide support between or stability to the tray support members 80. For example, the cross-support member 88 may extend between lower ends of the tray support members 80. In one example, the cross-support member 88 may comprise a panel having dimensions approximately similar in length and width to the inner dimensions of the upper tray portion or having dimensions approximately similar in length and width to the length and width of the lower tray portion between the tray support members. Any of a variety of other cross-support members are also contemplated, such as cross-support bars extending between mid-sections of the tray support members, cross-support bars extending at an angle from an upper section of one tray support member to a lower section of another tray support member, and so forth.

Figure 23:
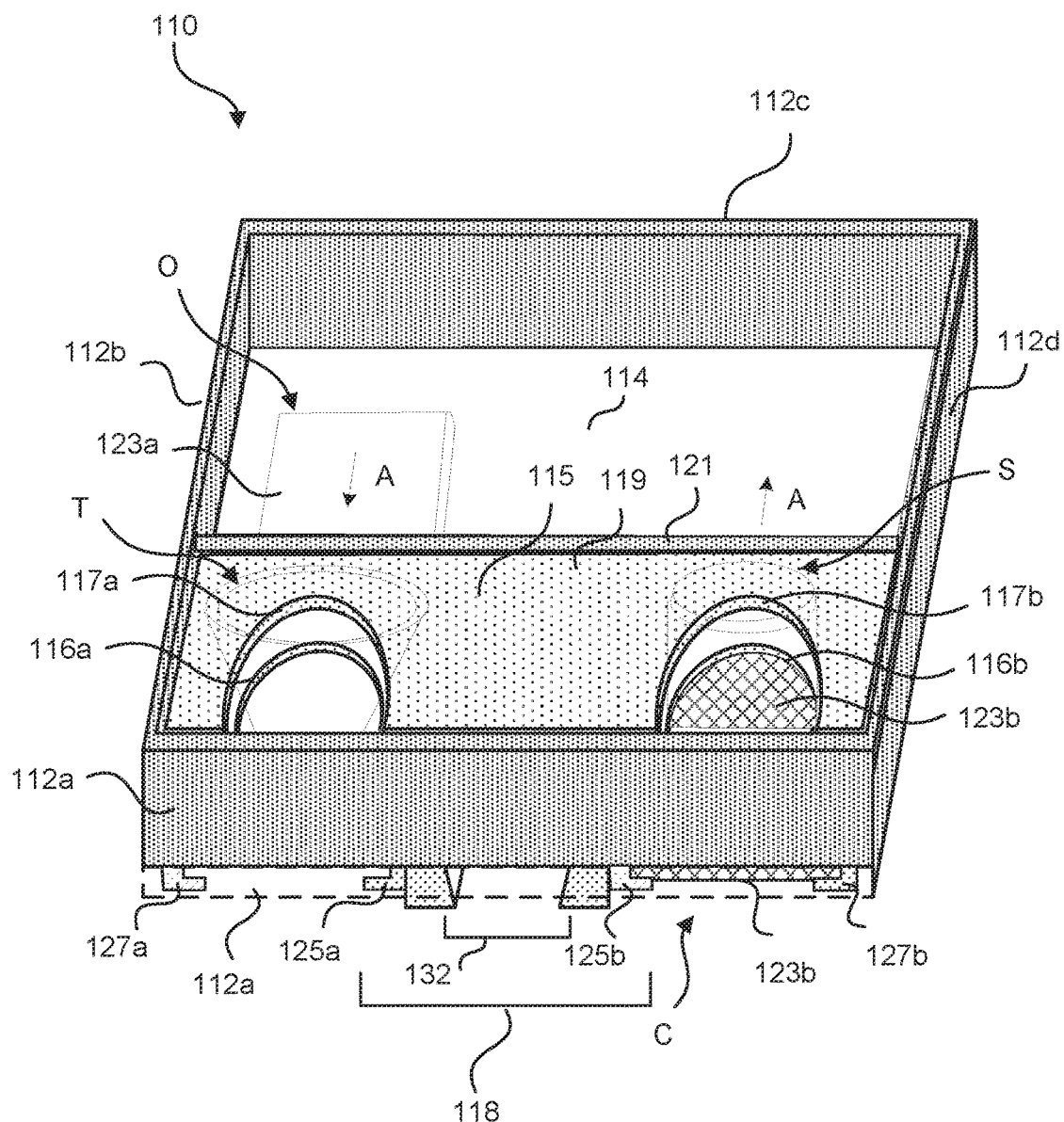
FIG. 23 is a front right perspective view of a tray in accordance with an embodiment of the present technology.
Figure 24:
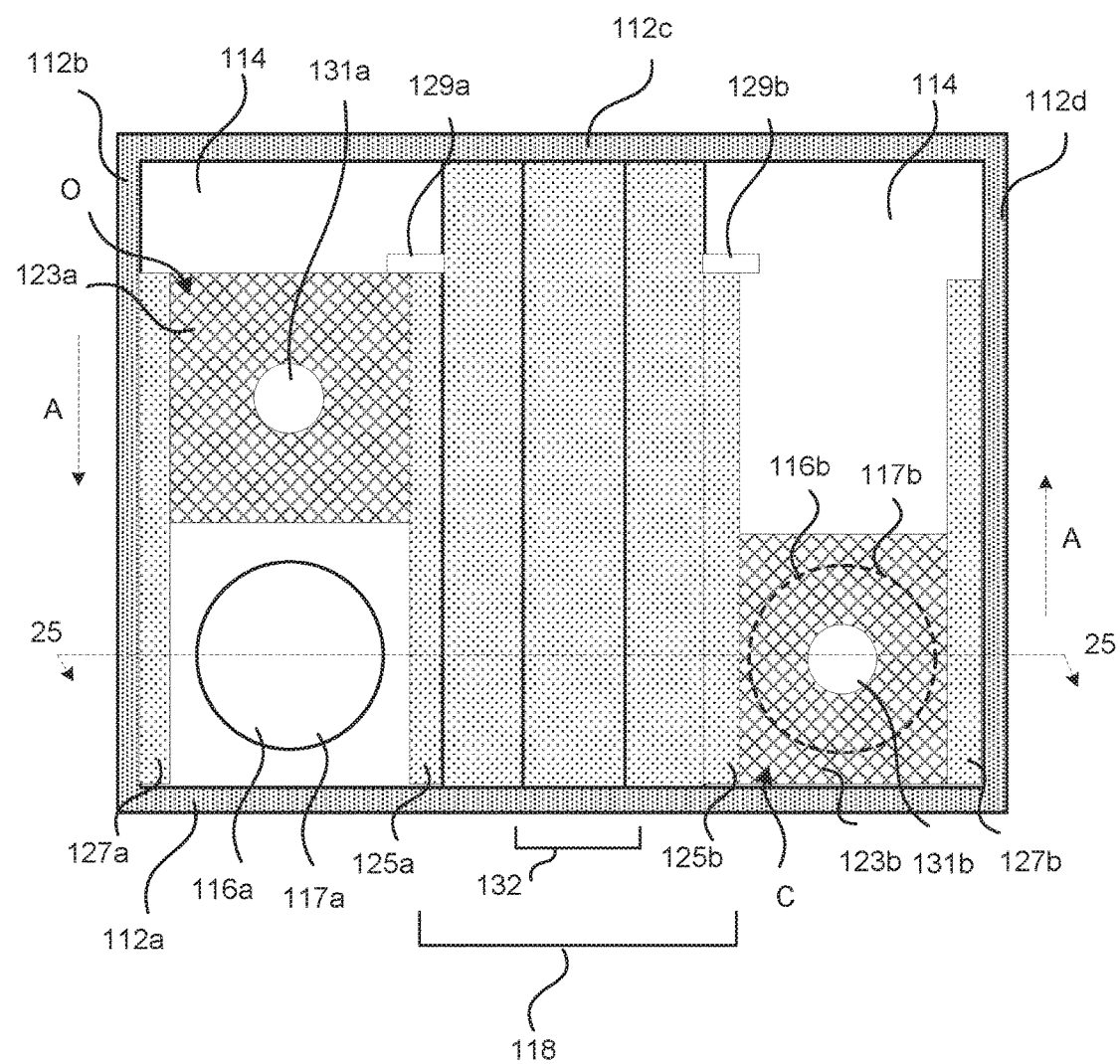
FIG. 24 is a bottom view of the tray of FIG. 23 in accordance with an embodiment of the present technology.
Figure 25:
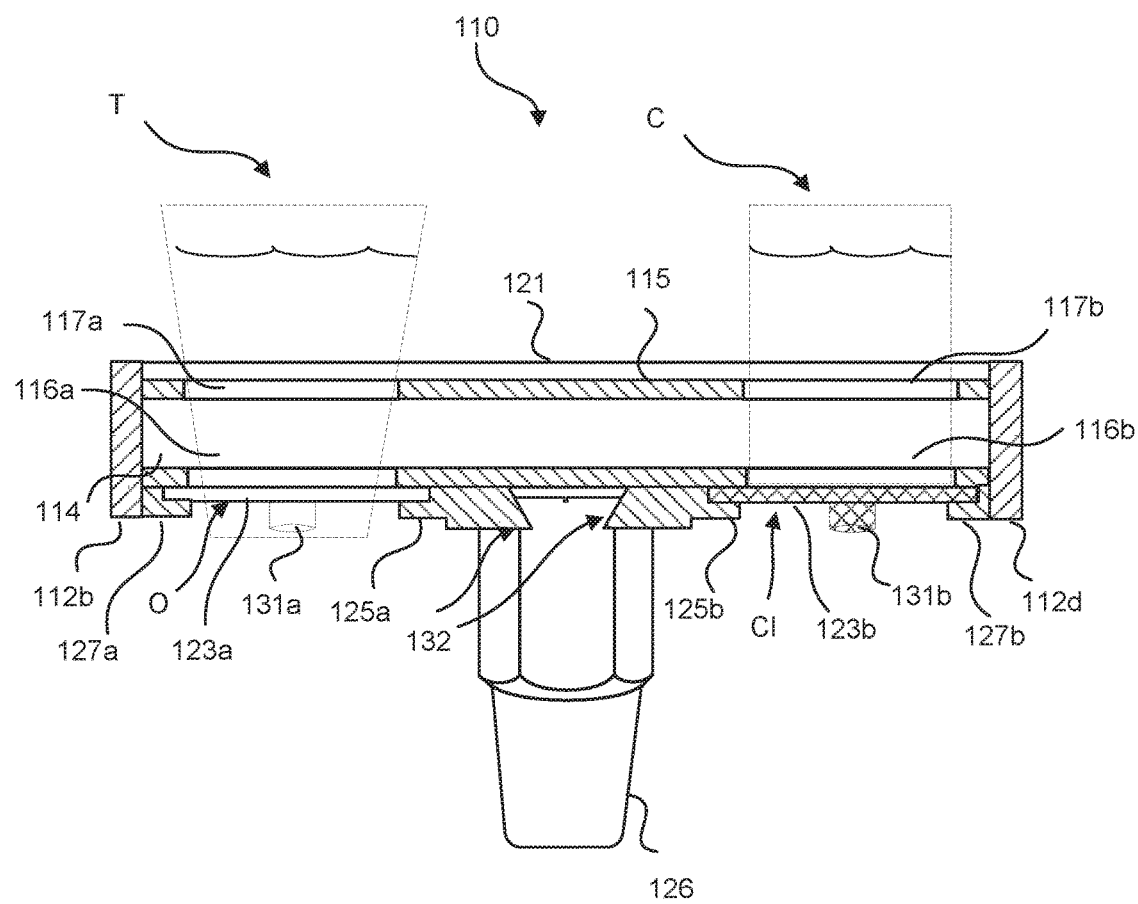
FIG. 25 is a cross-sectional view of the tray of FIG. 24 in accordance with an embodiment of the present technology.

FIGS. 23-25 illustrate a tray and system in an example implementation in accordance with the technology for use in a vehicle and capable of carrying or supporting food, beverages and any of a variety of other items, such as personal items, a map, a global positioning system (GPS), a mobile phone, or any of a wide variety of innumerable other objects.

The tray 110 may be formed of any of a variety of different materials including, but not limited to, wood, plastic, metal, composite and other materials and combinations thereof. The formation and/or assembly of the tray may be performed using any of a variety of technologies as may be understood by one having skill in the art. For example, a wood tray may be created by carving the tray from a single piece of wood or may be assembled by gluing, stapling, nailing press-fitting and so forth. As a specific example, a wall circumscribing the tray may include interlocking walls 112a-d. Also, each wall 112a-d may include a groove for receiving the edge of the bottom of the tray. A metal tray may be created through machining, molding, bending, welding or the like. Plastic or composite trays may be created through blow-molding, snap-fitting, gluing or the like. Any of a variety of other methods of manufacture may also be used.

The tray 110 may be fashioned in a variety of shapes or sizes. The tray 110 may generally include a bottom 114 and sides 112a-d circumscribing the bottom. The sides 112a-d may be short so as to form a small lip around the periphery of the tray or may be taller such that the tray may be more box or container like. In the example illustrated the tray 110 is rectangular shaped. Square, circular, oval, polygonal and other shapes may also be used. However, a quadrilateral shape, such as a square or rectangle, for example, may be preferable in some implementations over other shapes in order to efficiently use space occupied by the tray and provide a surface area of the bottom that is not minimized by curvature or the like.

The bottom 114 of the tray 110 can have a first opening 116a and a second opening 116b (e.g., apertures) formed adjacent each other and each having a substantially circular shape, for instance (e.g., FIG. 25). An optional upper tray panel 115 can be configured parallel to the bottom 114 (e.g., FIG. 23). The upper tray panel 115 can have a first upper opening 117a and a second upper opening 117b that are each in a corresponding position and shape to the first and second openings 116a and 116b of the bottom 114. Thus, the first opening 116a can be substantially concentric with the first upper opening 117a, and the second opening 116b can be substantially concentric with the second upper opening 117a (see e.g., FIG. 25). Each opening can be substantially the same shape and size, or they can be different. The upper tray panel 115 can be coupled to upper portions of sides 112a, 112b, and 112d of the tray (e.g., in a tongue-and-groove configuration, or via adhesive or other suitable attachment devices). A rear end 119 or the upper tray panel 115 can be attached to a vertical support panel 121, which can also be attached to sides 112 in a similar suitable manner. The vertical support panel 121 can be interlocked to the bottom 114 and to the sides 112b and 112d.

The tray 110 can have a first support panel 123a slidably engaged about the bottom of the tray 110, and a second support panel 123b slidably engaged about a bottom of the tray 110. Each support panel 123a and 123b can be slidable between a closed position C (e.g., 123b) and an open position O (e.g., 123a) relative to the associated openings thereabove, as shown on FIGS. 23-25. The first opening 115a and the first upper opening 117a are sized and shaped to laterally and vertically support a tapered beverage container T (shown in phantom lines) when the first support panel 123a is in the open position O. The same holds true for openings 115b and 117b, meaning that the second support panel 123b (and 123a) is sized and shaped to vertically support a cylindrical beverage container S (shown in phantom lines) when the second support panel 123b is in the closed position C, as illustrated on FIGS. 23 and 25. In one example, the tray is supportable by a cup holder of the vehicle.

In one example, the tray 110 comprises a center track 118 formed in a bottom of the tray 110. The first support panel 123a is slidable about the center track 118 on one side, and the second support panel 123b is slidable about the track 118 on the other side. In this manner, the center track 118 can have a left center track 125a that slidably supports the first support panel 123a, and a right center track 125b that slidably supports the second support panel 123b. Optionally, and preferably, a left end track 127a extends along the bottom 114 and substantially parallel to the left center track 125a. The left end track 127a can be positioned a distance from track 125a slightly farther away than the width of the first support panel 123a to slidably receive the first support panel 123a about both of said tracks 125a and 127a (i.e., a first pair of tracks being 125a and 127a). Said first pair of tracks 125a and 127a cooperatively and vertically support, and slidably receive, the first support panel 123a. Similarly, a right end track 127b extends along the bottom 114 and substantially parallel to the right center track 125b. The right center track 125b can be positioned at a distance from track 125b slightly farther away than the width of the second support panel 123b, to slidably receive the second support panel 123b about both of said tracks 125b and 127b (i.e., a second pair of tracks being tracks 125b and 127b). Said second pair of tracks 125b and 127b cooperatively and vertically support, and slidably receive, the second support panel 123b. Note that a lower edge of side 112a is shown in phantom lines on FIG. 23 for illustration purposes in order to view the features behind said lower edge. See FIG. 24 for the manner that side 112a extends below the bottom 114. In this way, said lower edge acts as a "stop" to prevent the support panels 123a and 123b from sliding completely out of the tray 110.

In some examples, each support panel 123a and 123b include a grip device 131a and 131b (e.g., FIGS. 24 and 25). Each grip device 131a and 131b may be a nob (or other graspable device) secured to and extending from a bottom of each support panel 123a and 123b, respectively. The grip devices 131a and 131b are sized and shaped to allow an individual to grab and slide the respective support panel 123a or 123b bi-directionally in directions shown by arrows A (FIGS. 23 and 24).

In one example as shown on FIG. 24, a pair of stop members 129a and 129b are attached to the tray 110 (i.e., to the bottom and/or center track) and have a flange portion extending inwardly the respective support panels 123a and 123b as a "stop" for respective support panels 123a and 123b to retain each support panel within respective tracks.

In one example as shown on FIG. 25, a base 126 is slidably attached to a central center track 132 of the center track member 118 (see also FIG. 23). The base 126 is sized and shaped to fit within a cup holder of a vehicle and is configured to support the tray 110 while supported by the cup holder. The base 126 can have similar features and functionality as described with reference to the base 26 and tray 10 of FIGS. 1-22. For example, track member 118 can have sides (e.g., 24; see FIGS. 4a and 19) that dovetail with a track insert (e.g., 36; see FIGS. 5a and 8) of the base 126. In one example, said sides and said track insert of the base 126 can be a male-female interface having 90 degree interfacing edges, such as existing between the slidable interface of the first support panel 123a about the first pair of tracks 125a and 127a, for instance.

As best illustrated on FIG. 25, the first support panel 123a is positioned in the open configuration O to allow passage of a lower portion of the tapered beverage container T through the first opening 116a and the first upper opening 117a. Thus, a particular circumference portion of the container T will be vertically supported by the first upper opening 117a of the upper support panel 115. Similarly, the second support panel 123b is positioned in the closed configuration Cl to prevent or restrict passage (e.g., due to gravity) of a lower portion of the cylindrical beverage container C beyond the second opening 116b. In other words, the second support panel 123b vertically supports the container C (as the panel 123b is vertically supported by tracks 125b and 127b), and while the openings 116b and 117b laterally support the container C to prevent it from falling sideways (i.e., when the vehicle turns). In this way, a diameter of each of openings 116b and 117b can be greater than 2.60 inches (which is the diameter of a typical soda can at its widest point). While reference has been made herein primarily to use of the tray in a vehicle, the tray may be used in any of a number of other contexts as well, such as contexts in which a cup holder is present. For example, cup holders are prevalent in vehicles, furniture (e.g., couches), strollers and so forth. The tray may be used in any one or more of such contexts and may be moved from one context to another for use in a plurality of contexts.

While the example shown in FIG. 25 includes both the upper tray panel 115 and the support panels 123a-b, in some examples the tray may include the upper tray panel 115 and omit inclusion of support panels 123a-b together with the tracks 125a-b and 127a-b. Alternatively, the tray in some examples may omit the upper tray panel 115 and include the support panels 123a and 123b together with the tracks 125a-b and 127a-b.

Reference has been made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A tray for use in a vehicle, comprising:
a tray positionable in a vehicle and having at least one opening formed through a bottom of the tray, the tray having a first support panel slidably engaged about the bottom of the tray, the first support panel slidable between a closed position and an open position relative to the at least one opening, wherein:
the at least one opening is sized and shaped to laterally and vertically support a tapered beverage container when the first support panel is in the open position,
the first support panel is sized and shaped to vertically support a cylindrical beverage container positioned on the first support panel when the first support panel is in the closed position,
a lower edge of the tray is a stop to prevent the first support panel from sliding out of the tray, and
an upper surface of the first support panel comprises a flat, planar surface extending continuously from where the first support panel is slidably engaged about the bottom of the tray and across the at least one opening when the first support panel is in the closed position.

2. The tray of claim 1, wherein the tray is supportable by a cup holder of the vehicle.

3. The tray of claim 1, further comprising a track formed in a bottom of the tray, wherein the first support panel is slidable along the track.

4. The tray of claim 3, further comprising a second support panel slidable about the track, the second support panel being slidable between a closed position and an open position relative to another one of the at least one opening, wherein the second support panel is configured to support a beverage container when in the closed position.

5. The tray of claim 4, wherein the track is included in a first pair of tracks supported about the bottom of the tray and about which the first support panel slides.

6. The tray of claim 5, further comprising a second pair of tracks supported about the bottom of the tray about which the second support panel slides.

7. The tray of claim 6, further comprising a center track member extending along the bottom of the tray, the center track member having a first center track about which the first support panel is slidably supported and a second center track about which the second support panel is slidably supported, the first pair of tracks including the first center track and a second pair of tracks including the second center track.

8. The tray of claim 7, further comprising a base slidably attached to a central center track of the center track member, wherein the base is sized and shaped to fit within a cup holder of the vehicle and is configured to support the tray while supported by the cup holder.

9. The tray of claim 7, further comprising a first side track along a first side of the tray and a second side track along a second side of the tray, wherein the first side track and the first center track cooperatively support the first support panel, and wherein the second side track and the second center track cooperatively support the second support panel.

10. The tray of claim 8, wherein the base comprises a track insert sized and shaped to fit within the central center track.

11. The tray of claim 8, wherein the tray is repositionable on the base at any position along an entire width or length of the track.

12. The tray of claim 1, wherein the at least one opening vertically and laterally supports inwardly tapered sides of the tapered beverage container, and wherein the first support panel vertically supports the cylindrical beverage container comprising substantially parallel sides.

13. The tray of claim 1, further comprising an upper tray panel having at least one opening positioned above the at least one opening of the bottom of the tray, wherein the pair of openings are sized and shaped to support the tapered beverage container.

14. A tray system for use in a vehicle, comprising:
a base, sized and shaped to fit within a vehicle cup holder;
a bottom tray panel attachable to the base, the bottom tray panel having a first opening and a second opening; and
a first support panel and a second support panel, the first and second support panels each being slidably engaged about the bottom of the tray and movable between a closed position and an open position, wherein the first and second openings are sized and shaped to laterally and vertically support a tapered beverage container when in the open position, the first and second support panels are sized and shaped to vertically support a cylindrical beverage container positioned on the first or second support panels when in the closed position to prevent the cylindrical beverage container from falling through at least one of the first and second openings, a lower edge of the tray is a stop to prevent the first or second support panel from sliding out of the tray, and an upper surface of the first or second support panel comprises a flat, planar surface extending continuously from where the first or second support panel is slidably engaged about the bottom of the tray and across the at least one opening when the first or second support panel is in the closed position.

15. The tray system of claim 14, further comprising a center track member extending along the bottom of the tray, the center track member having a first track slidably supporting the first support panel and a second track slidably supporting the second support panel, the center track member having a pair of central tracks configured for slidably receiving the base.

16. The tray system of claim 8, wherein the center track member is slidable about the base at any position along an entire width or length of the center track.

17. A method for supporting different beverage containers, comprising:
positioning a tray having a first opening formed through a bottom of the tray in a vehicle, the tray having a first support panel slidably engaged about the bottom of the tray, the first support panel slidable between a closed position and an open position relative a first opening;
supporting a tapered beverage container laterally and vertically using the first opening when the first support panel is in the open position;
sliding the first support panel between the open position and the closed position; and
supporting a cylindrical beverage container vertically using the first support panel when the first support panel is in the closed position;
wherein a lower edge of the tray is a stop to prevent the first panel from sliding out of the tray, and an upper surface of the first support panel comprises a flat, planar surface extending continuously from where the first support panel is slidably engaged about the bottom of the tray and across the at least one opening when the first support panel is in the closed position.

18. The method of claim 17, further comprising:
positioning a second support panel slidably engaged about the bottom of the tray, the second support panel slidable between a closed position and an open position relative a second opening;
supporting a tapered beverage container laterally and vertically using the second opening when the second support panel is in the open position;
sliding the second support panel between the open position and the closed position; and
supporting a cylindrical beverage container vertically using the second support panel when the second support panel is in the closed position.

19. The method of claim 17, further comprising a base attached to the tray, wherein the base is sized and shaped to fit within a cup holder of the vehicle.

20. The method of claim 19, further comprising sliding the base along a center track member of the tray.

* * * * *